US009921737B2

(12) United States Patent
Seo et al.

(10) Patent No.: US 9,921,737 B2
(45) Date of Patent: Mar. 20, 2018

(54) FLEXIBLE APPARATUS AND CONTROL METHOD THEREOF

(71) Applicant: SAMSUNG ELECTRONICS CO., LTD., Suwon-si (KR)

(72) Inventors: Joon-kyu Seo, Suwon-si (KR); Kyung-a Kang, Seoul (KR); Ji-yeon Kwak, Seoul (KR); Hyun-jin Kim, Seoul (KR); Geun-ho Lee, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 70 days.

(21) Appl. No.: 14/030,211

(22) Filed: Sep. 18, 2013

(65) Prior Publication Data

US 2014/0078088 A1 Mar. 20, 2014

(30) Foreign Application Priority Data

Sep. 18, 2012 (KR) ........................ 10-2012-0103481

(51) Int. Cl.
*G06F 3/0488* (2013.01)
*G06F 3/041* (2006.01)
*G06F 1/16* (2006.01)

(52) U.S. Cl.
CPC .......... *G06F 3/0488* (2013.01); *G06F 1/1626* (2013.01); *G06F 1/1643* (2013.01);
(Continued)

(58) Field of Classification Search
CPC .. G06F 3/0488; G06F 3/04883; G06F 1/1626; G06F 1/1652; G06F 1/1643;
(Continued)

(56) References Cited

U.S. PATENT DOCUMENTS 8,654,075 B2 2/2014 Kim
2003/0227441 A1* 12/2003 Hioki .................... G06F 3/0412
345/156
(Continued)

FOREIGN PATENT DOCUMENTS

CN 101152646 A 4/2008
CN 201289634 Y 8/2009
(Continued)

OTHER PUBLICATIONS

International Search Report, dated Jan. 14, 2014, issued by the International Searching Authority in counterpart International Application No. PCT/KR2013/008463.
(Continued)

*Primary Examiner* — Kumar Patel
*Assistant Examiner* — Amy C Onyekaba
(74) *Attorney, Agent, or Firm* — Sughrue Mion, PLLC

(57) ABSTRACT

A flexible apparatus is provided. The flexible apparatus includes: a screen generator configured to generate a user interface (UI) screen; a plurality of sensors configured to sense deformation of the flexible apparatus and output a result of sensing; a storage configured to store a crumple determining condition with regard to crumpling of the flexible apparatus; and a controller configured to determine whether the result of the sensing by the plurality of sensors satisfies the crumple determining condition stored in the storage, and in response to determining that the crumple determining condition is satisfied, perform an operation corresponding to the crumple determining condition.

13 Claims, 32 Drawing Sheets

(52) U.S. Cl.
CPC .......... *G06F 1/1652* (2013.01); *G06F 3/0412* (2013.01); *G06F 3/04883* (2013.01)

(58) Field of Classification Search
CPC .......... G06F 3/0412; G06F 2203/04102; G06F 2200/1637; H04M 1/0268
USPC .................................................. 345/173–174
See application file for complete search history.

(56) References Cited

U.S. PATENT DOCUMENTS

| | | | |
|---|---|---|---|
| 2006/0238494 A1* | 10/2006 | Narayanaswami | G06F 3/002 345/156 |
| 2009/0262083 A1 | 10/2009 | Parekh | |
| 2010/0056223 A1 | 3/2010 | Choi et al. | |
| 2010/0093399 A1* | 4/2010 | Kim et al. | 455/566 |
| 2010/0117975 A1* | 5/2010 | Cho | 345/173 |
| 2010/0120470 A1 | 5/2010 | Kim et al. | |
| 2010/0141605 A1* | 6/2010 | Kang et al. | 345/174 |
| 2010/0164888 A1* | 7/2010 | Okumura | G06F 1/1626 345/173 |
| 2010/0225578 A1 | 9/2010 | Ko | |
| 2011/0057873 A1* | 3/2011 | Geissler et al. | 345/156 |
| 2012/0115422 A1 | 5/2012 | Tziortzis et al. | |
| 2012/0133621 A1 | 5/2012 | Kim | |
| 2013/0093660 A1* | 4/2013 | Hirsch | G06F 1/1694 345/156 |

FOREIGN PATENT DOCUMENTS

| | | |
|---|---|---|
| CN | 102007464 A | 4/2011 |
| CN | 102566816 A | 7/2012 |
| KR | 10-2010-0023256 A | 3/2010 |

OTHER PUBLICATIONS

Written Opinion, dated Jan. 14, 2014, issued by the International Searching Authority in counterpart International Application No. PCT/KR2013/008463.
Lee, et al., "How Users Manipulate Deformable Displays as Input Devices", CHI 2010: Devising Input, Apr. 10, 2010-Apr. 15, 2010, Atlanta, Georgia, pp. 1647-1656, XP 055021459.
Communication dated Mar. 21, 2016, issued by the European Patent Office in counterpart European Patent Application No. 13838727.9.
Communication dated Jul. 4, 2017 by the State Intellectual Property Office of P.R. China in counterpart Chinese Patent Application No. 201380048593.2.

* cited by examiner

FIG. 13
(a) 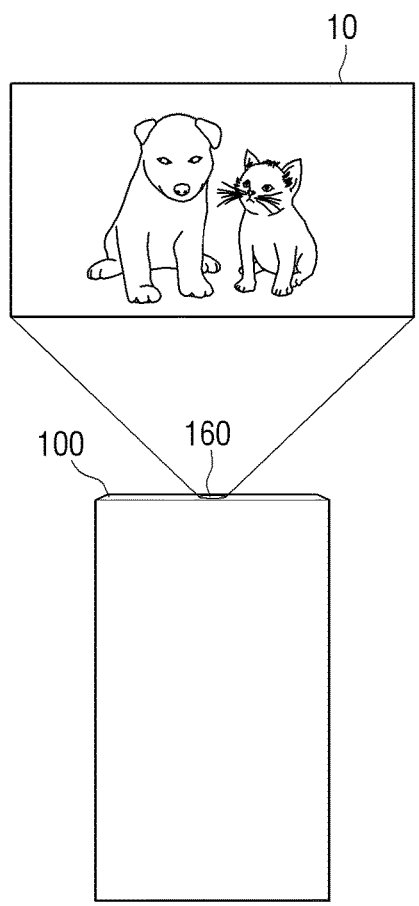
(b) 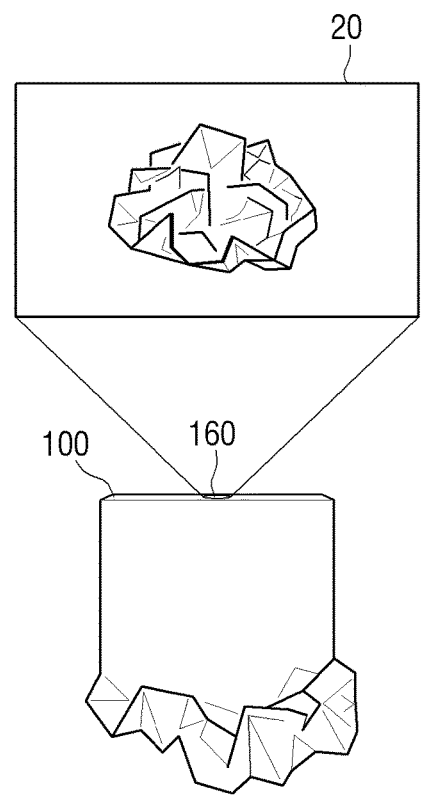

FIG. 14
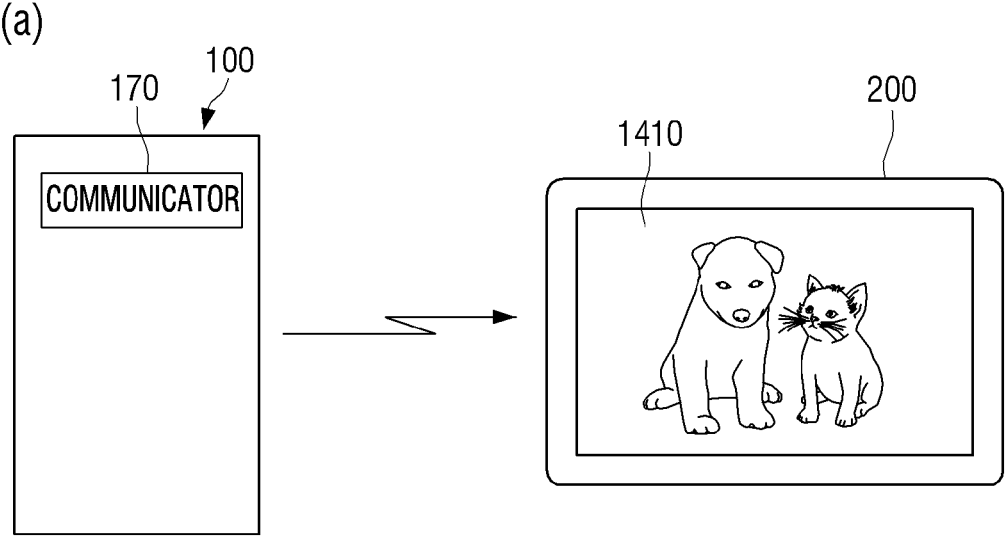
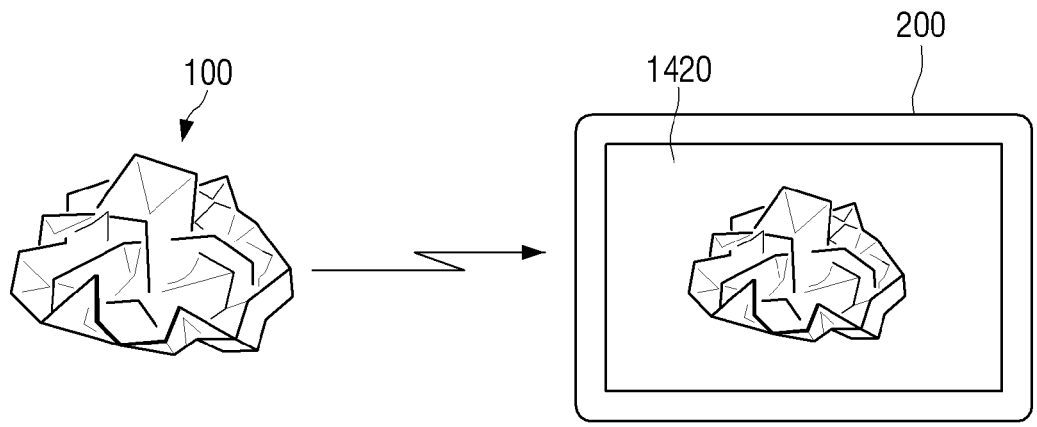

FIG. 18

| FIRST PROTECTION LAYER | ~151 |
| DISPLAY PANEL | ~152 |
| TOUCH SENSOR | ~153 |
| SECOND PROTECTION LAYER | ~154 |

FIG. 24
(a)
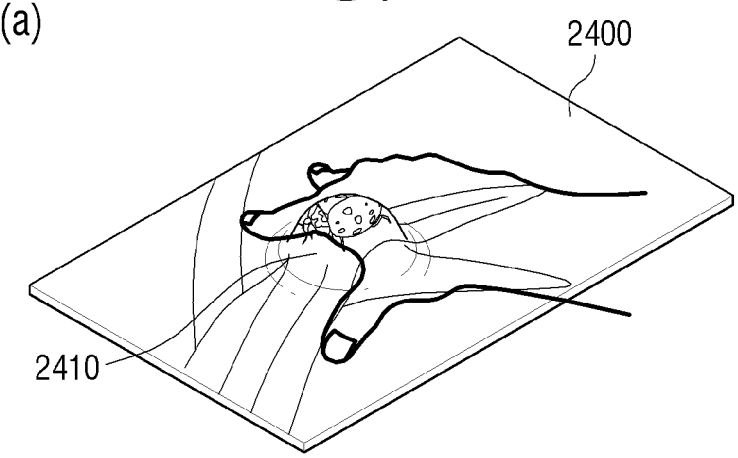
(b)
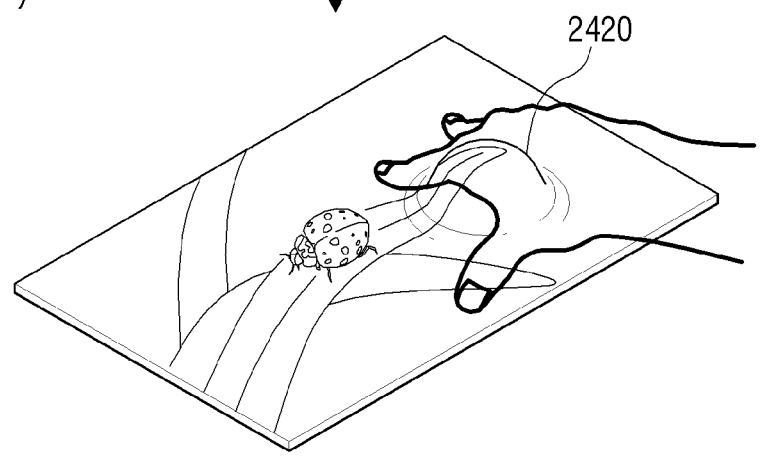
(c)
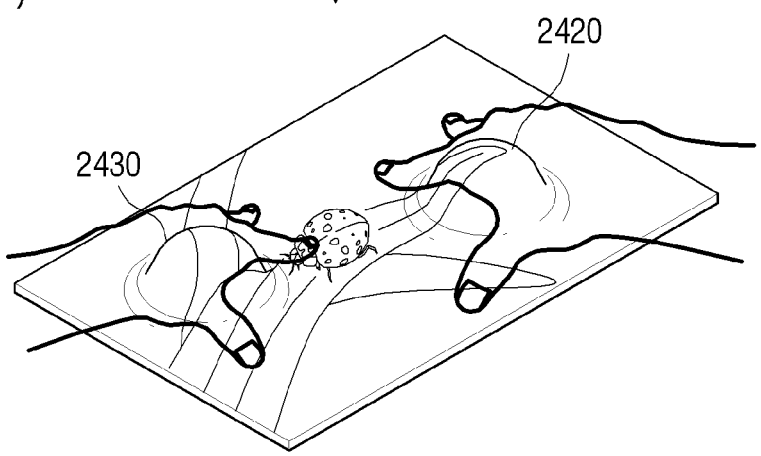

FIG. 25
(a)
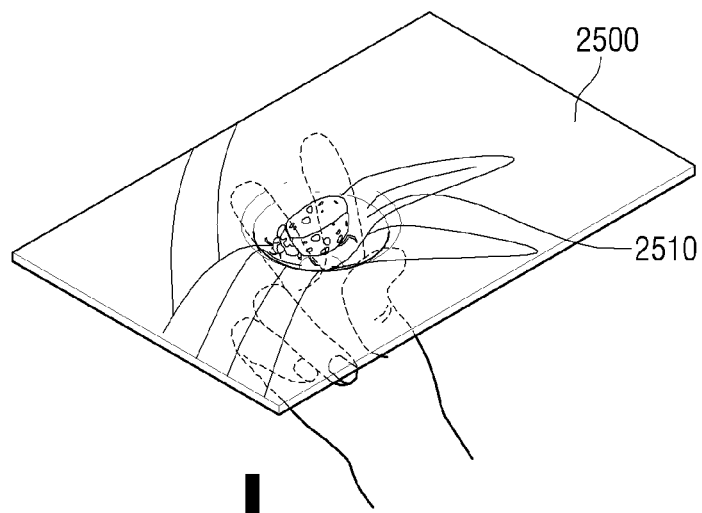
(b)
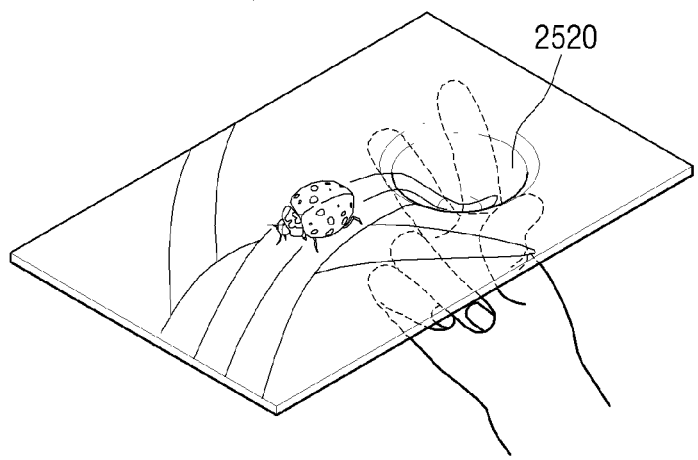
(c)
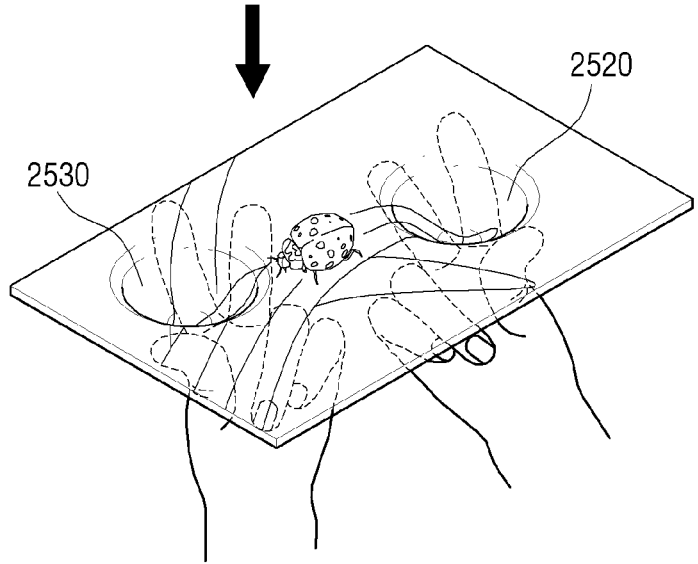

FIG. 26
(a)
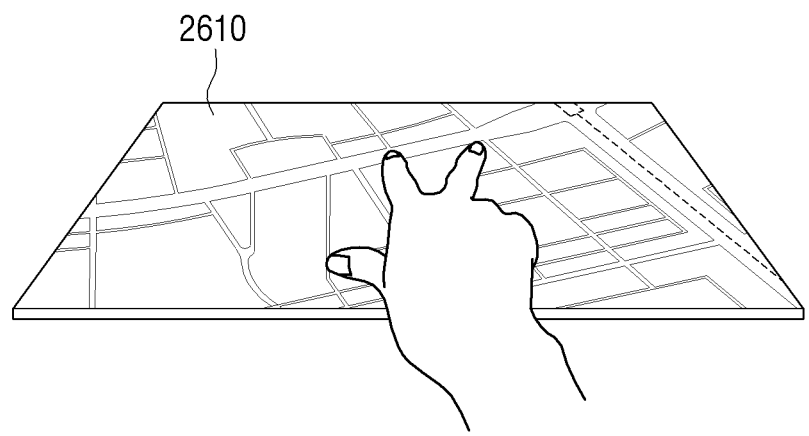
(b)
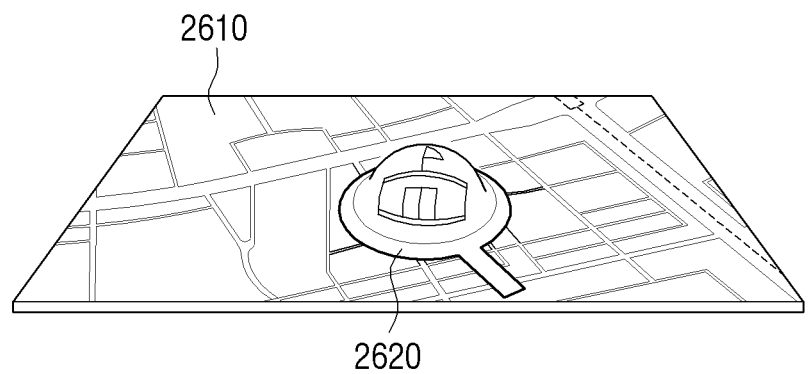

FIG. 28
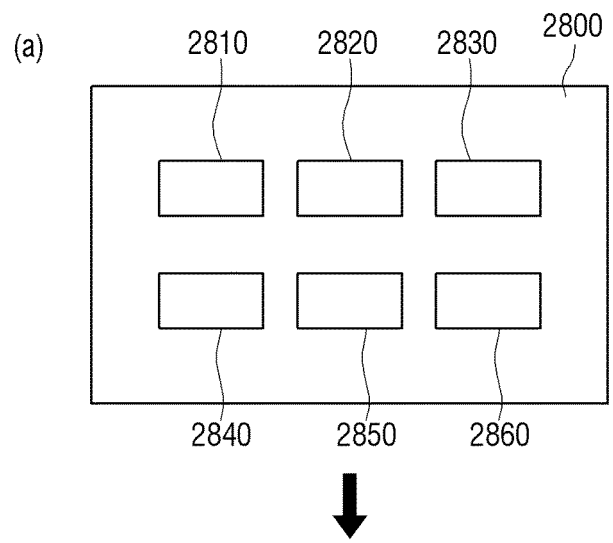
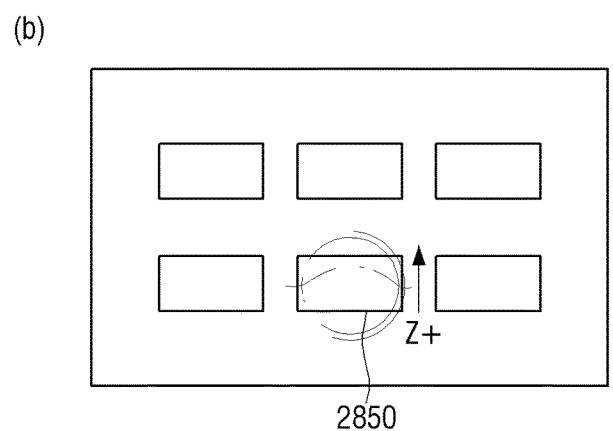
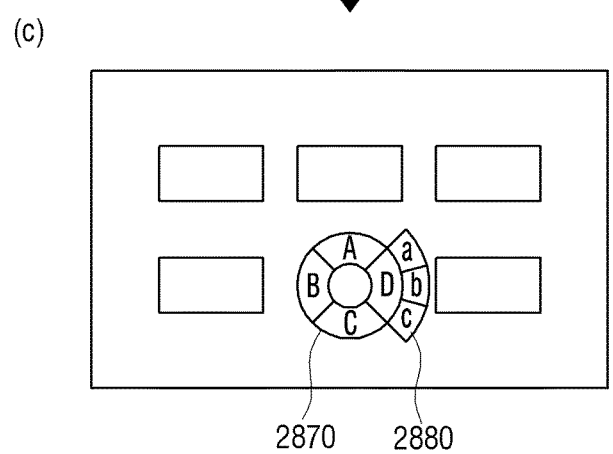

FLEXIBLE APPARATUS AND CONTROL METHOD THEREOF

CROSS-REFERENCE TO RELATED APPLICATION

This application claims priority from Korean Patent Application No. 10-2012-0103481, filed on Sep. 18, 2012 in the Korean Intellectual Property Office, the disclosure of which is incorporated herein by reference in its entirety.

BACKGROUND

1. Field

Apparatuses and methods consistent with exemplary embodiments relate to a flexible apparatus and a control method thereof, and more particularly, to a flexible apparatus which senses deformation, such as crumpling, pinching up, or poking down, and performs an operation corresponding to the deformation, and a control method thereof.

2. Description of the Related Art

With the development of electronic technologies, various kinds of display apparatuses have been developed and implemented in various apparatus applications. In particular, display apparatuses such as television (TVs), personal computers (PCs), laptops, tablet PCs, mobile phones, and MP3 players are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus refers to a display apparatus that may be deformed into different shapes and configurations.

Flexible apparatuses such as flexible display apparatuses may be deformed by a force that is applied by a user.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a flexible apparatus, which, when a deformation such as crumpling, pinching up or poking down is sensed, can perform an operation corresponding to the sensed deformation, and a control method thereof.

According to an aspect of an exemplary embodiment, there is provided a flexible apparatus including: a screen generator configured to generate a user interface (UI) screen; a plurality of sensors configured to sense a deformation of the flexible apparatus and output a result of sensing; a storage configured to store a crumple determining condition with regard to crumpling of the flexible apparatus; and a controller configured to determine whether the result of the sensing by the plurality of sensors satisfies the crumple determining condition stored in the storage, and in response to determining that the crumple determining condition is satisfied, perform an operation corresponding to the crumpling determining condition.

The controller may be configured to control the screen generator to change the UI screen.

The crumple determining condition may include a condition on a maximum number of sensors. When at least one of the plurality of sensors senses the deformation of the flexible apparatus and outputs a sensing value, the controller is configured to compare a number of sensors outputting the sensing values and the condition on the maximum number of sensors, and determine that the crumpling determining condition is satisfied if the number of sensors exceeds the condition on the maximum number of sensors.

The crumple determining condition may include at least one of a condition on a maximum number of bending lines which are formed by the deformation of the flexible apparatus, a condition on a forming direction of each of the bending lines, a condition on a forming angle of each of the bending lines, a condition on a number of points of intersection between the bending lines, and a condition on a time range within which the bending lines are formed.

The flexible apparatus may further include a display that is flexible and is configured to display the UI screen.

The flexible apparatus may further include a beam projector configured to emit beams corresponding to the UI screen.

The flexible apparatus may further include a communicator configured to communicate with an external display apparatus.

The controller may be configured to perform an operation related to content displayed on the UI screen.

The operation may be one of shuffling operation of rearranging locations of a plurality of contents displayed on the UI screen, deleting operation of deleting a content or a program corresponding to the UI screen, turn off operation of deleting the UI screen, and shutting off power of the flexible apparatus.

The plurality of sensors may be arranged on a surface of the flexible apparatus. The controller is further configured to determine that pinching up to pick up a local area of the flexible apparatus or poking down to press down the local area occurs if the result of sensing by the plurality of sensors indicates the deformation is sensed by at least one sensor arranged in one area from among the plurality of sensors, and perform an operation corresponding to the pinching up or the poking down.

The operation corresponding to the pinching up or the poking down comprises at least one of an operation of magnifying or reducing an object displayed at a corresponding point, an operation of copying the object, an operation of pasting the copied object on a clip board area, an operation of increasing or decreasing a number displayed at the corresponding point, an operation of displaying detailed information on the object, an operation of displaying an adjustment menu on the object, an operation of deleting the object, an operation of executing a program corresponding to the object, and an operation of transmitting content corresponding to the object to an external apparatus.

According to an aspect of another exemplary embodiment, there is provided a flexible display apparatus including: a screen generator configured to generate a user interface (UI) screen; a display configured to display the UI screen; a plurality of sensors arranged in the display, and configured to sense a deformation of the flexible display apparatus and output a result of sensing; and a controller configured to determine whether pinching up to pick up a local area of the display or poking down to press down the local area occurs based on the result of the sensing by the plurality of sensors, and control the screen generator to change the UI screen in response to determining that the pinching up or the poking down occurs.

The display may include: a display panel; a first protection layer stacked on a first surface of the display panel and made of a flexible material; and a second protection layer stacked on a second surface of the display panel and made of a flexible material. When the pinching up occurs in a first direction, the first protection layer may be locally separated from the first surface at a point where the pinching up occurs. When the pinching up occurs in a second direction which is opposite to the first direction, the second protection layer may be locally separated from the second surface at a point where the pinching up occurs.

The plurality of sensors may be touch sensors arranged on the first surface or the second surface of the display panel, and are configured to sense separation between the first protection layer and the display panel, and separation between the second protection layer and the display panel.

The controller is configured to, in response to determining that the pinching up or the poking down occurs, perform an operation related to an object displayed on the UI screen.

The operation comprises at least one of an operation of magnifying or reducing an object displayed at a corresponding point, an operation of copying the object, an operation of pasting the copied object on a clip board area, an operation of increasing or decreasing a number displayed at the corresponding point, an operation of displaying detailed information on the object, an operation of displaying an adjustment menu on the object, an operation of deleting the object, an operation of executing a program corresponding to the object, and an operation of transmitting content corresponding to the object to an external apparatus.

According to an aspect of another exemplary embodiment, there is provided a method for controlling of a flexible apparatus, the method including: receiving a result of sensing by a plurality of sensors arranged in the flexible apparatus; determining whether the result of the sensing satisfies a crumple determining condition with regard to crumpling of the flexible apparatus; and performing an operation corresponding to the crumple determining condition, in response to determining that the crumple determining condition is satisfied.

The crumple determining condition may include at least one of a condition on a maximum number of sensors which sense shape deformation of the flexible apparatus, a condition on a maximum number of bending lines formed by shape deformation of the flexible apparatus, a condition on a forming direction of each of bending lines formed by shape deformation of the flexible apparatus, a condition on a forming angle of each of the bending lines, and a condition on a number of points of intersection between the bending lines.

The method may further include emitting beams to display the changed UI screen.

The method may further include transmitting data on the changed UI screen to an external display apparatus.

The operation corresponding to the crumpling may be one of an shuffling operation of rearranging locations of a plurality of contents displayed on the UI screen, a deleting operation of deleting a content or a program corresponding to the UI screen, a turn off operation of deleting the content, or a shutting off power of the flexible apparatus.

The method may further include: determining that pinching up a local area of the flexible apparatus or poking down to press down the local area occurs if the result of sensing by the plurality of sensors indicates a shape deformation is sensed by at least one sensor arranged in one area from among the plurality of sensors; and, in response to determining that the pinching up or the poking down occurs, performing at least one of an operation of magnifying or reducing an object displayed at a corresponding point, an operation of copying the object, an operation of pasting the copied object on a clip board area, an operation of increasing or decreasing a number displayed at the corresponding point, an operation of additionally displaying detailed information on the object, an operation of additionally displaying an adjustment menu on the object, an operation of deleting the object, an operation of executing a program corresponding to the object, and an operation of transmitting a content corresponding to the object to an external apparatus.

According to an aspect of another exemplary embodiment, there is provided a method for controlling of a flexible display apparatus, the method including: displaying a user interface (UI) screen on a display; sensing, by a plurality of sensors distributed on the display, a deformation of the flexible display apparatus; determining whether pinching up to pick up a local area of the display or poking down to press down the local area occurs based on a result of the sensing; and performing an operation corresponding to the pinching up or poking down, in response to determining that the pinching up or the poking down occurs.

The operation comprises changing the UI screen displayed on the screen of the display.

The operation may be at least one of an operation of magnifying or reducing an object displayed at a point where the pinching up or poking down occurs, an operation of copying the object, an operation of pasting the copied object on a clip board area, an operation of increasing or decreasing a number displayed at the corresponding point, an operation of additionally displaying detailed information on the object, an operation of additionally displaying an adjustment menu on the object, an operation of deleting the object, an operation of executing a program corresponding to the object, and an operation of transmitting a content corresponding to the object to an external apparatus.

BRIEF DESCRIPTION OF THE DRAWINGS

The above and/or other aspects will be more apparent by describing in detail exemplary embodiments, with reference to the accompanying drawings, in which:

FIG. 13 is a view illustrating an example of a configuration of a flexible apparatus including a beam projection function;

FIG. 14 is a view illustrating an operation of a flexible apparatus which communicates with an external display apparatus;

FIG. 18 is a view illustrating an example of a configuration of a display which senses local shape deformation;

FIGS. 20 to 28 are views illustrating various examples of operations performed when location shape deformation occurs;

DETAILED DESCRIPTION OF EXEMPLARY EMBODIMENTS

Figure 1:
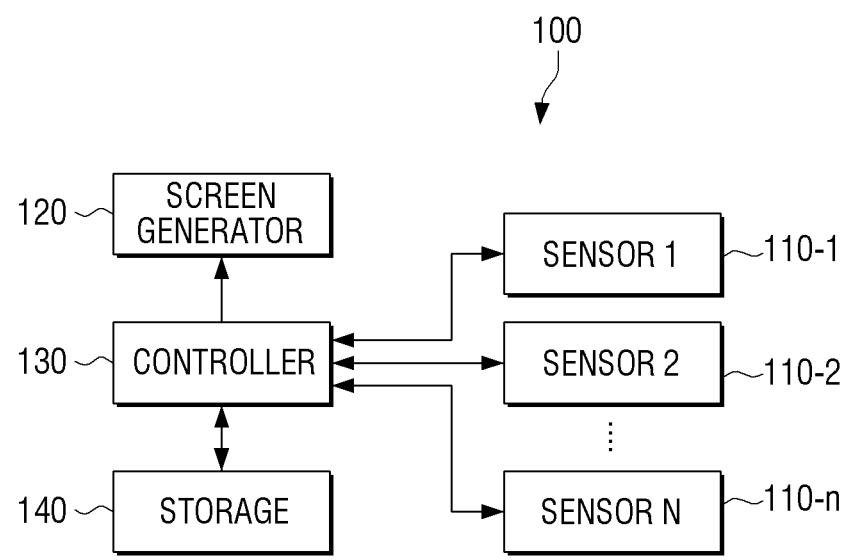
FIG. 1 is a block diagram illustrating a configuration of a flexible apparatus according to an exemplary embodiment.

Hereinafter, exemplary embodiments will be described in greater detail with reference to the accompanying drawings.

In the following description, same reference numerals are used for the same elements depicted in different drawings. The matters defined in the description, such as detailed construction and elements, are provided to assist in a comprehensive understanding of the exemplary embodiments. Thus, it is apparent the exemplary embodiments may be carried out without those specifically defined matters. Also, functions or elements known in the related art are not described in detail to avoid obscuring the exemplary embodiments with unnecessary detail.

FIG. 1 is a block diagram illustrating a configuration of a flexible apparatus according to an exemplary embodiment. The flexible apparatus 100 refers to an apparatus that is made of flexible material in whole or in part and has its shape changed by a user's force. The flexible apparatus 100 may be implemented using various kinds of apparatuses, such as a mobile phone, a personal digital assistant (PDA), an electronic album, an electronic book, an electronic scheduler, an MP3 player, a tablet PC, a laptop computer, a monitor, a kiosk, a personal computer (PC), a remote controller, and a beam projector. Referring to FIG. 1, the flexible apparatus 100 includes a plurality of sensors 110-1 to 110-n, a screen generator 120, a controller 130, and a storage 140.

The plurality of sensors 110-1 to 110-n are disposed in the flexible apparatus 100 and sense a shape deformation of the flexible apparatus 100. Each of the sensors 110-1 to 110-n may be implemented by using a strain gage. The strain gage uses metal or a semiconductor in which a resistance is greatly changed according to an applied force, and senses deformation of a surface of an object to be measured according to a change in the resistance value. It is common that a material such as metal increases a resistance value when a length of the metal is stretched by an external force, and decreases the resistance value when the length is contracted. Accordingly, when a compressive force is applied to each of the sensors 110-1 to 110-n, the resistance value decreases, and, when a tensile force is applied, the resistance value increases. A strength of an electric signal output from each of the sensors 110-1 to 110-n is changed according to the resistance value of each of the sensors 110-1 to 110-n. The controller 130 may determine a shape deformation by determining the change in the output value of each of the sensors 110-1 to 110-n. The sensors 110-1 to 110-n may be implemented by using piezoelectric sensors or other bend sensors.

The storage 140 stores various programs and data used in the flexible apparatus 100. The storage 140 may store a condition for determining a type of shape deformation. Types of shape deformation may include "single bending" in which only an edge or a corner is bent, "multi-bending" in which two or more portions are bent, "folding" in which the flexible apparatus is bent by more than a predetermined angle, "rolling", "twist", "crumpling", "pinching up" in which a part is taken up, and "poking down" in which a part is pressed, and other types of deformation.

When a result of sensing by each of the plurality of sensors 110-1 to 110-n is received, the controller 130 compares the results of the sensing and the stored determining condition, and determines whether shape deformation occurs. Specifically, when the results of the sensing by the plurality of sensors 110-1 to 110-n satisfy a crumple determining condition, the controller 130 determines that the flexible apparatus 100 is crumpled.

The screen generator 120 may be configured to generate various user interface (UI) screens. The UI screen refers to a screen that includes various objects such as icons, images, and texts, an application screen generated by executing various applications, an input screen on which a soft keyboard or various keys are displayed, a main screen on which various menus are displayed, an icon display screen on which various icons are displayed, and/or a lock screen informing a lock state.

The screen generator 120 may include a calculator (not shown), a renderer (not shown), and a buffer (not shown). The calculator calculates attribute values, such as a coordinate value, a shape, a size, and a color of each object to be displayed according to a layout of a corresponding screen stored in the storage 140. The renderer generates screens of various layouts including objects based on the attribute values calculated by the calculator. Screen data generated by the renderer is stored in the buffer. The screen data stored in the buffer may be used by various elements.

When it is determined that crumpling occurs, the controller 130 performs an operation corresponding to the crumpling. The controller 130 controls the screen generator 120 to change the UI screen according to the crumpling. The operation corresponding to the crumpling may be determined according to a kind of an application, a kind of content, or a kind of a function executed when the crumpling occurs, or a configuration of a UI screen displayed when the crumpling occurs.

Specifically, if the crumpling occurs while a UI screen including at least one object is displayed, the controller 130 may perform various operations, such as a shuffling operation to rearrange an order of a plurality of contents displayed on the UI screen, a deleting operation to delete content or a program corresponding to the UI screen while deforming the UI screen into a crumpling shape, a turn-off operation to delete the UI screen, and shut off the power of the flexible apparatus. A change in the UI screen according to such an operation will be explained in detail below.

Each element of the flexible apparatus 100 as shown in FIG. 1 may be embedded in a body case. The body case may be made of a flexible material in whole or in part. Specifically, the body case may be implemented by using a plastic substrate (e.g., a polymer film) which is deformable by an external pressure. The plastic substrate has a structure which is formed by barrier coating opposite surfaces of a base film. The base film may be implemented by using various resins, such as polyimide (PI), polycarbonate (PC), polyethyleneterephthalate (PET), polyethersulfone (PES), polyethylenenaphthalate (PEN), and fiber reinforced plastic (FRP). The barrier coating is performed on the opposite surfaces of the base film. An organic membrane or an inorganic membrane may be used for the purpose of maintaining flexibility. Accordingly, the flexible apparatus 100 may be deformed by the user.

Figure 2:
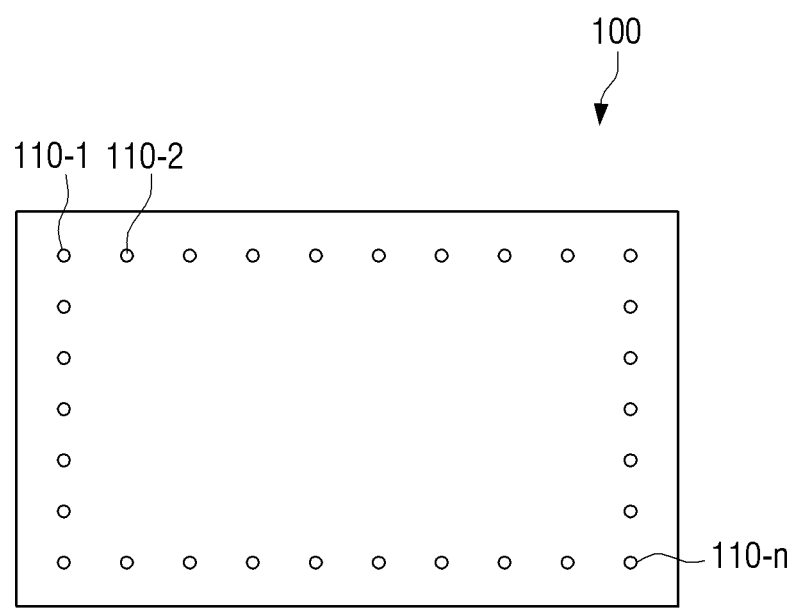
FIG. 2 is a view illustrating an example of a configuration to sense a shape deformation of a flexible apparatus.

FIG. 2 is a view illustrating an example of arrangement of sensors according to an exemplary embodiment. Referring to FIG. 2, a plurality of sensors 110-1 to 110-$n$ may be arranged along an edge of the flexible apparatus 100 in a line. Although the plurality of sensors 110-1 to 110-$n$ are aligned in a line in FIG. 2, the plurality of sensors 110-1 to 110-$n$ may be aligned in two or more lines according to an exemplary embodiment.

In the state in which the sensors 110-1 to 110-$n$ implemented by using strain gages are arranged, a compressive force or a tensile force is applied to the sensors 110-1 to 110-$n$ located where the shape deformation occurs. The sensors 110-1 to 110-$n$ output sensing values of levels corresponding to the compressive force or the tensile force. The controller 130 determines a type of shape deformation according to the location of the sensor outputting the sensing value and the level of the sensing value.

Figure 3:
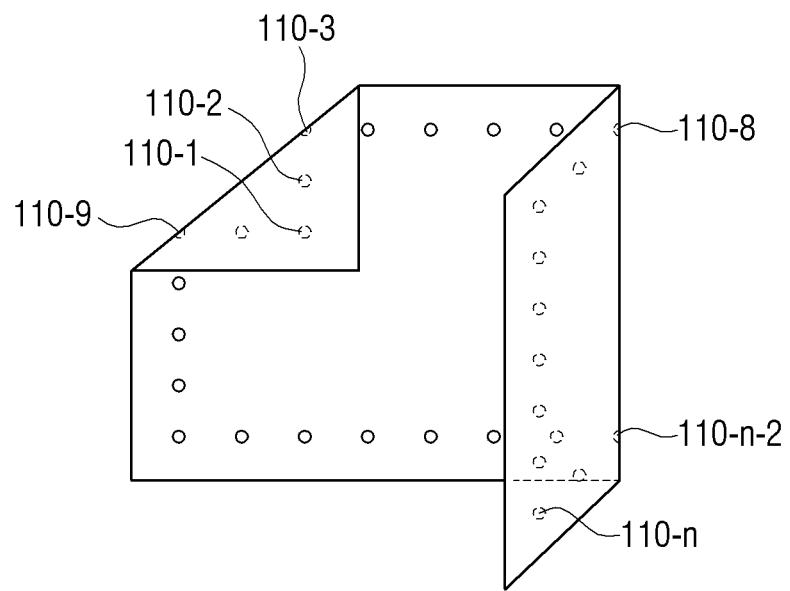
FIG. 3 is a view illustrating a method for sensing a shape deformation in the flexible apparatus having the configuration of FIG. 2.

FIG. 3 illustrates multi-bending in which a plurality of areas of the flexible apparatus 100 are bent. Referring to FIG. 3, when the plurality of sensors 110-1 to 110-$n$ are arranged along the edge and one corner and one edge area are bent, a bending line is formed between the bent area and the other area. The sensors arranged along the bending line are subject to a compressive force or a tensile force greater than that of the other sensors. Referring to FIG. 3, as the left upper corner area is bent, a bending line connecting the 3rd sensor 110-3 and the 9th sensor 110-9 is formed, and, as the right edge area is bent, a bending line connecting the 8th sensor 110-8 and the n−2th sensor 110-$n$−2 is formed.

Although the flexible apparatus 100 is bent in a first direction which is perpendicular to a surface of the flexible apparatus 100 in FIG. 3, the flexible apparatus 100 may also be bent in a second direction which is opposite to the first direction. When the sensors 110-1 to 110-$n$ are arranged on a rear surface with reference to a center of the flexible apparatus 100, and, when the flexible apparatus 100 is bent in the first direction, the tensile force is exerted to the sensors 110-1 to 110-$n$, and, when the flexible apparatus 100 is bent in the second direction, the compressive force is exerted to the sensors 110-1 to 110-$n$. On the other hand, when the sensors 110-1 to 110-$n$ are arranged on a front surface with reference to the center of the flexible apparatus 100, and, when the flexible apparatus 100 is bent in the first direction, the compressive force is exerted to the sensors 110-1 to 110-$n$, and, when the flexible apparatus 100 is bent in the second direction, the tensile force is exerted to the sensors 110-1 to 110-$n$.

When the 3rd sensor 110-3 and the 9th sensor 110-9 output sensing values within a predetermined time, the controller 130 determines that the left upper corner is bent, and determines whether the left upper corner is bent in the first direction or the second direction according to the levels of the sensing values. Also, when the 8th sensor 110-8 and the n−2th sensor 110-$n$−2 output sensing values within a predetermined time, the controller 130 determines that the right edge area is bent, and determines whether the right edge area is bent in the first direction or second direction according to the levels of the sensing values. The operation of determining the type of shape deformation based on the bending line and the bending direction may be performed based on the determining condition, which is stored in the storage 140.

The condition for determining the above-described single bending, multi-bending, and folding may include locations and a number of sensors outputting sensing values, and values which are pre-set on the levels of those sensing values. In the case of rolling or twist, the condition for determining the type of shape deformation may include a difference between the levels of the sensing values output from the sensors and values which are pre-set on a bending direction.

On the other hand, crumpling may occur in the flexible apparatus 100. The crumpling refers to crumpling the flexible apparatus 100.

Figure 4:
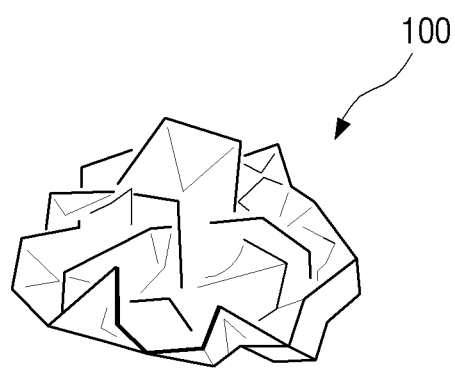
FIG. 4 is a view illustrating a flexible apparatus in a crumpling state.

FIG. 4 illustrates a shape of the crumpled flexible apparatus 100. When crumpling occurs, a plurality of bending lines are formed in the flexible apparatus 100, and locations or directions of the bending lines, and bending directions are randomly determined. The controller 130 compares the results of sensing by the sensors 110-1 to 110-$n$ and the crumple determining condition stored in the storage 140, and determines whether the crumpling occurs.

The crumple determining condition may be set as various values and stored according to an exemplary embodiment. For example, a manufacturer or designer of the flexible apparatus 100 performs crumpling multiple times, and stores the number of sensors by which shape deformation is sensed in the crumpling state, and a sensing value range which is determined based on a maximum value, an average value, and a minimum value of the sensing values of those sensors, as the crumple determining condition. In this case, when the number of sensors outputting sensing values falling within the sensing value range from among the sensors by which the shape deformation is sensed is greater than or equal to a predetermined number, the controller 130 determines that the crumpling occurs.

For another example, the crumple determining condition may be set considering a service supported by the flexible apparatus 100. That is, the flexible apparatus 100 may be set to support a service corresponding to each shape deformation area when shape deformation occurs in four locations to the maximum. In this case, when multi-bending is performed, sensing values are output from eight sensors to the maximum. Accordingly, the crumple determining condition may be a condition on a maximum number that determines the number of sensors outputting sensing values to be more than nine.

For still another example, the crumple determining condition may include a condition on a time range within which bending lines are formed. That is, when multi-bending is performed, bending lines are formed in sequence since the user bends corners or edges in sequence. Therefore, the two sensors that sense a single bending line output sensing values at similar time, but the two sensors that sense a next bending line output sensing values in a predetermined time later. On the other hand, when crumpling occurs, two or more bending lines are formed within a short time. Accordingly, when sensing values are output from more than a predetermined number of sensors within a predetermined time, the controller 130 may determine that crumpling occurs.

Further, the crumple determining condition may include at least one of a condition on a maximum number of bending lines generated by shape deformation of the flexible apparatus 100, a condition on a forming direction of each bending line, a condition on a forming angle of each bending line, and a condition on a number of points of intersection where bending lines meet.

Figure 5:
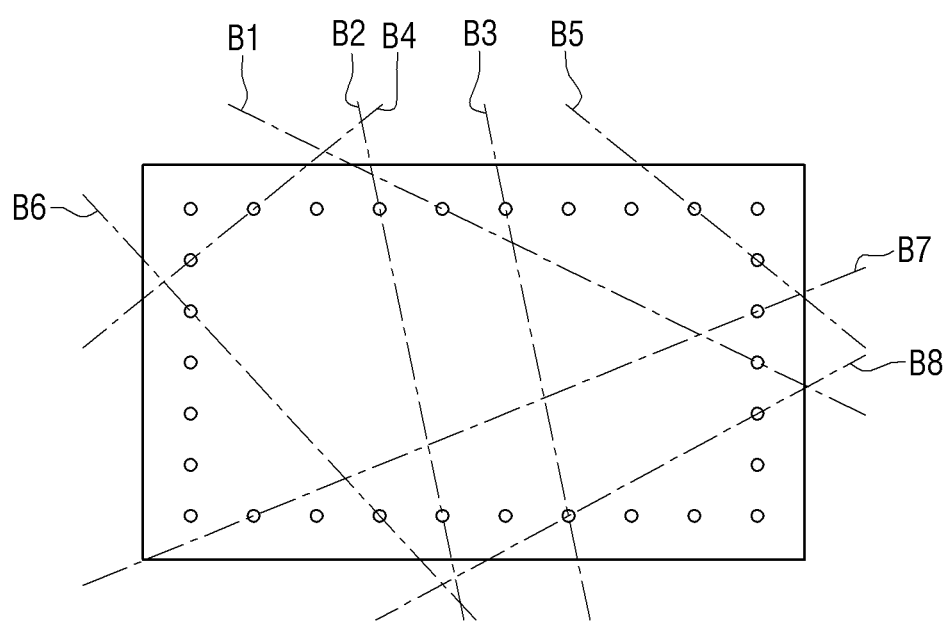
FIG. 5 is a view illustrating bending lines formed when crumpling occurs.

The condition on the maximum number of bending lines refers to a condition that determines the maximum number of bending lines formed when crumpling occurs. FIG. 5 is a view illustrating bending lines formed when crumpling occurs by way of an example.

When the flexible apparatus 100 crumpled as shown in FIG. 4 is spread on a plane, a plurality of bending lines may be formed as shown in FIG. 5. The controller 130 determines a line connecting two sensors that output sensing values falling within a similar range at predetermined time intervals from among the plurality of sensors 110-1 to 110-n as a single bending line. Referring to FIG. 5, eight bending lines (B1 to B8) are sensed. When the condition on the maximum number of bending lines is set to five or more, the controller 130 determines that crumpling occurs.

The condition on the forming direction and the condition on the forming angle refer to state conditions defined for a direction in which the bending lines are placed or an angle by which the bending lines are placed. The condition on the number of points of intersection refers to a condition that determines a number of points of intersection formed by intersecting bending lines.

Since it is common that bending lines formed by normal shape deformation other than crumpling do not intersect each other, the condition on the number of points of intersection may be set to 1 or 2 or more points and stored.

[81] On the other hand, the plurality of sensors 110-1 to 110-n may be arranged in a pattern which is different from that of FIG. 2.

Figure 6:
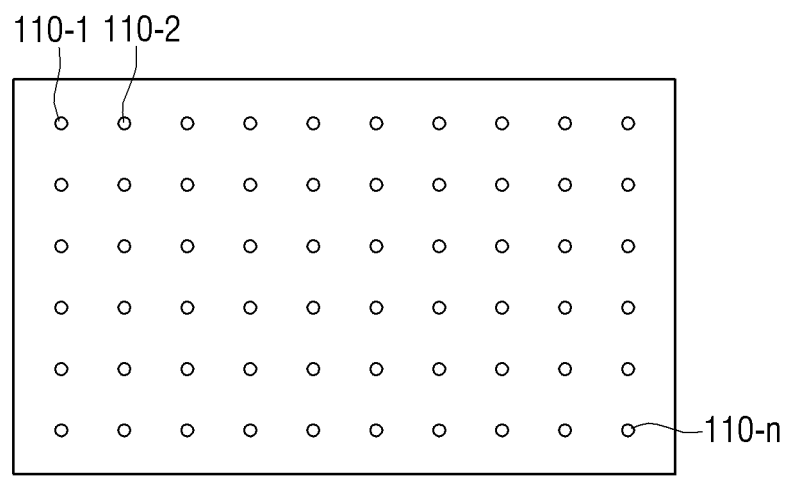
FIG. 6 is a view illustrating another example of a configuration to sense a shape deformation of a flexible apparatus.

FIG. 6 is a view illustrating a plurality of sensors 110-1 to 110-n arranged throughout the overall surface of the flexible apparatus 100. Although FIG. 6 illustrates the plurality of sensors 110-1 to 110-n arranged in the form of a matrix consisting of a plurality of rows and columns, the rows or columns may also be arranged alternately or may be arranged unevenly on the overall surface.

Figure 7:
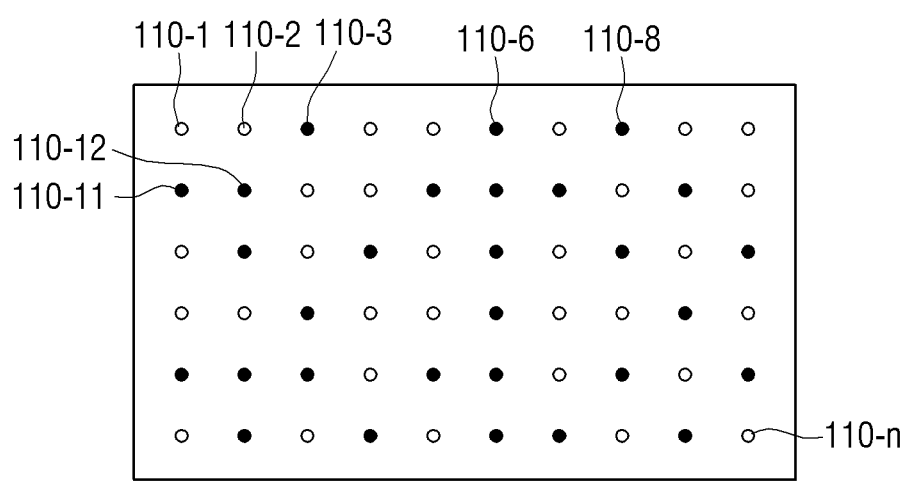
FIGS. 7 and 8 are views illustrating a method for sensing a shape deformation in the flexible apparatus having the configuration of FIG. 6.

FIG. 7 illustrates examples of sensors which output sensing values when crumpling occurs. Referring to FIG. 7, black dots indicate sensors that output sensing values, and white dots indicate sensors that do not output sensing values. When shape deformation occurs, the sensor at a point where the shape deformation occurs outputs a sensing value. However, in practice, all of the sensors may always output sensing values, and, when shape deformation occurs, the sensing value of the sensor at the point where the shape deformation occurs may be changed. However, for convenience of explanation, even the sensor that outputs a changed sensing value is described herein as the sensor outputting the sensing value.

The controller 130 selects a certain sensor from among the sensors outputting sensing values, and determines whether there is a sensor that outputs a sensing value from among nearby sensors around the certain sensor. When it is determined that there is a nearby sensor that outputs a sensing value, the controller 130 connects the selected certain sensor and the nearby sensor. By repeating such an operation, the controller 130 may determine whether local bending lines are formed, placement directions of those bending lines, and an intersection angle between the bending lines.

Figure 8:
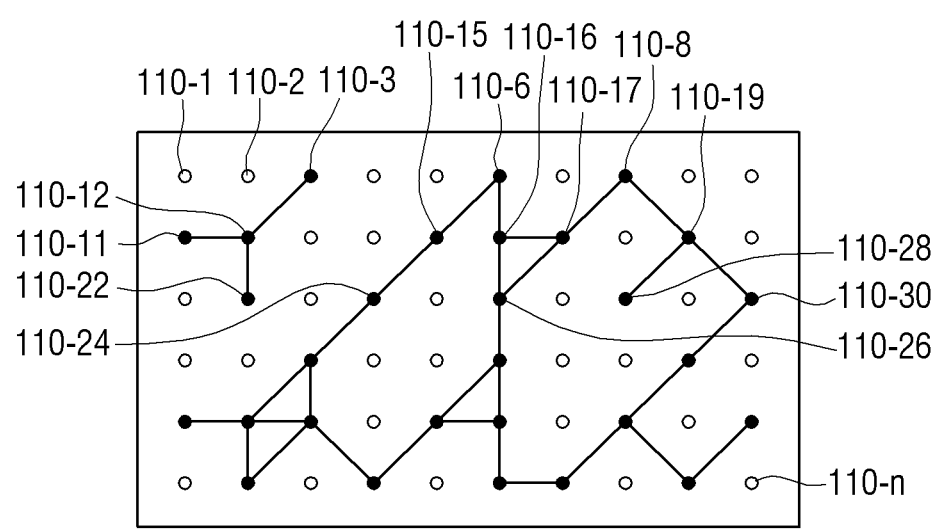

FIG. 8 is a view illustrating an example of a method for determining a bending line of the controller 130. When sensing values are output from the plurality of sensors as shown in FIG. 7, the controller 130 may select a certain sensor, for example, the 3rd sensor 110-3. The controller 130 selects the 12th sensor 110-12 which is a nearby sensor of the 3rd sensor 110-3 from among the plurality of sensors outputting sensing values, and selects the 11th and 22nd sensors 110-11 and 110-22 which are nearby sensors of the 12th sensor 110-12. When all of the sensors outputting the sensing values are connected in this way, local bending lines are determined as shown in FIG. 8.

When the crumple determining condition includes the condition on the forming direction or the condition on the forming angle of each bending line as described above, the controller 130 compares a direction of each bending line or a forming angle and the condition stored in the storage 140, and determines whether crumpling occurs. That is, when the number of local bending lines which are not parallel to one another is more than a predetermined number, the controller 130 determines that crumpling occurs.

When crumpling occurs, the controller 130 controls the screen generator 120 to change the UI screen according to the crumpling. The UI screen changed by the screen generator 120 may be variously used according to an exemplary embodiment of the flexible apparatus 100.

Figure 9:
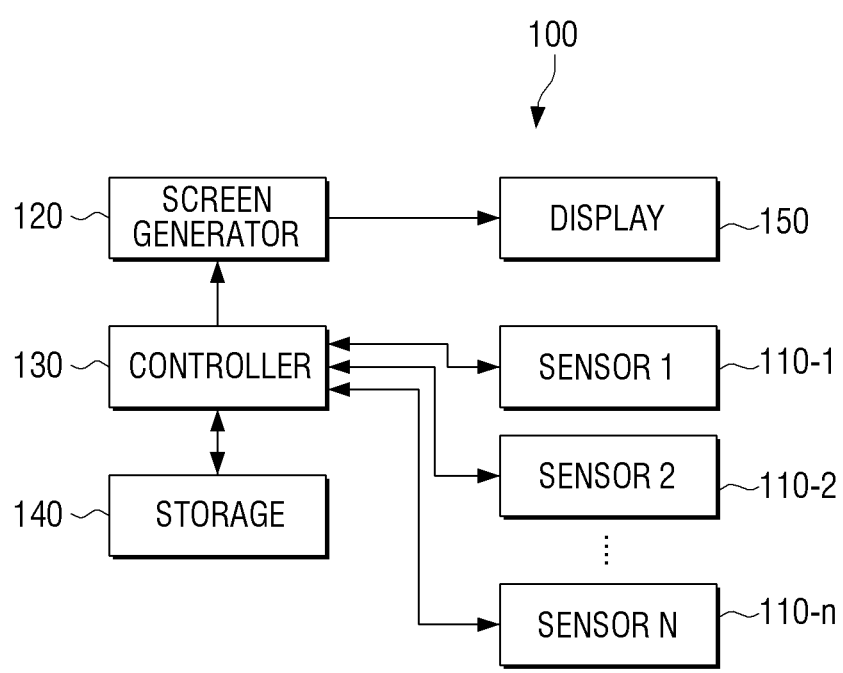
FIG. 9 is a view illustrating an example of a configuration of a flexible apparatus including a display function.

FIG. 9 is a block diagram illustrating a configuration of a flexible apparatus which includes a display function. Referring to FIG. 9, a flexible apparatus 100 includes a plurality of sensors 110-1 to 110-n, a screen generator 120, a controller 130, a storage 140, and a display 150. The same configuration and operation of the plurality of sensors 110-1 to 110-n, the screen generator 120, the controller 130, and the storage 140 as those of FIG. 1 are not described in detail.

The display 150 is formed on an overall surface or a part of the flexible apparatus 100, and displays various UI screens generated by the screen generator 120. The display 150 may include a display panel, a driving circuit, and a backlight unit.

The display panel may be implemented by a liquid crystal display (LCD), an organic light emitting diode (OLED), an electrophoretic display (EPD), an electrochromic display (ECD), and a plasma display panel (PDP).

The driving circuit is a circuit for driving the display panel. Specifically, the driving circuit applies a driving voltage to a plurality of pixels which constitute the display panel, and may include a transistor such as an a-si thin film transistor (TFT), a low temperature poly silicon (LTPS) TFT, or an organic TFT (OTFT) and so on. When an electric signal is applied to the transistor, the transistor may have a corresponding pixel cell in the display panel emit light. Accordingly, an image may be displayed on the display panel. The backlight unit includes a light source, such as a lamp or an LED arranged in a straight type or an edge type, and provides backlight toward the display panel. Each element of the display 150 is made of an organic material including carbon or manufactured thinly using foil, and thus has flexibility.

The sensors 110-1 to 110-n may be embedded in the display 150. Accordingly, the sensors 110-1 to 110-n may sense shape deformation.

When the UI screen is displayed on the display 150 and the crumpling occurs, the controller 130 controls the screen generator 120 to change the shape of the UI screen to various shapes.

Figure 10:
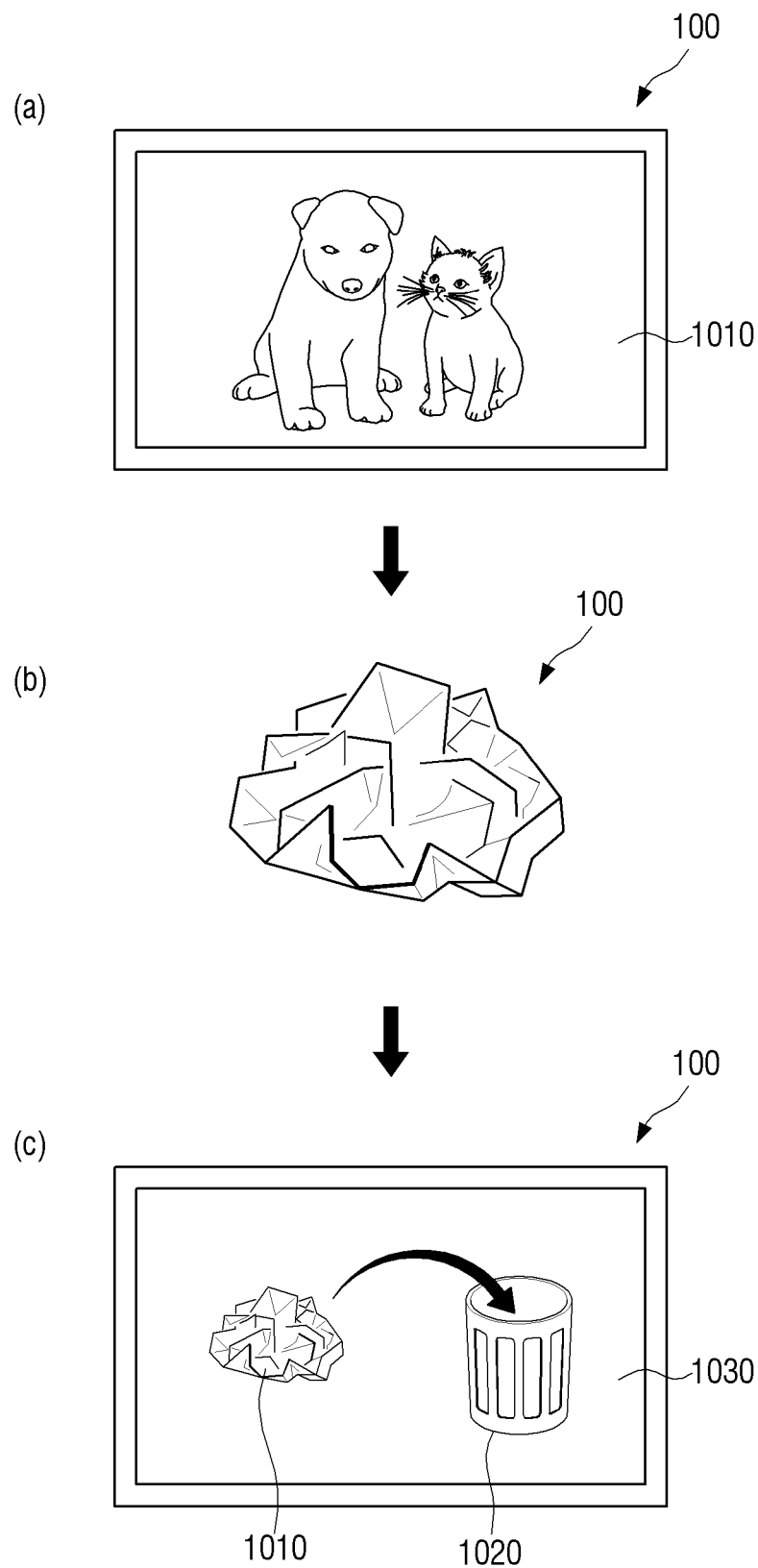
FIGS. 10 to 12 are views illustrating various examples of a method for changing a user interface (UI) screen when crumpling occurs.

FIG. 10 is a view illustrating an example of a UI screen changed by crumpling. Referring to FIG. 10, when one image 1010 is displayed on the display 150 (a), the flexible apparatus 100 is crumpled (b) and then is spread (c), a UI screen 1030 changed to show that the image 1010 displayed on the previous screen is crumpled and is put in a trash bin 1020 is displayed. The controller 130 controls the screen generator 120 to change the UI screen and controls the display 150 to display the changed UI screen as shown in FIG. 10. The controller 130 may delete the image 1010 displayed on the UI screen (i.e., content corresponding to the UI screen) from the storage 140. Although the image content displayed on the UI screen is deleted in FIG. 10, a program, such as an application or a widget, may also be deleted by crumpling. For example, when a game program is executed and a screen of the game program is displayed, when crumpling occurs, the controller 130 may delete the game program.

Figure 11:
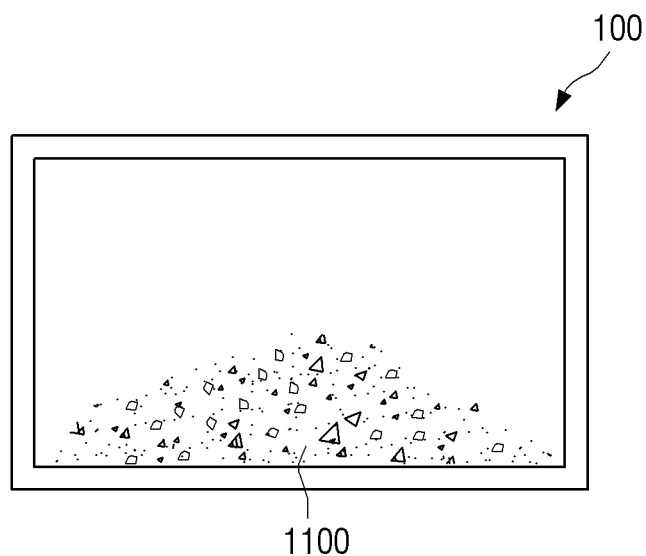

FIG. 11 illustrates an example of a UI screen when a deleting operation is performed. When crumpling occurs, the controller 130 may control the screen generator 120 to change the UI screen to show that the UI screen is crumpled and deleted as shown in FIG. 11.

Figure 12:
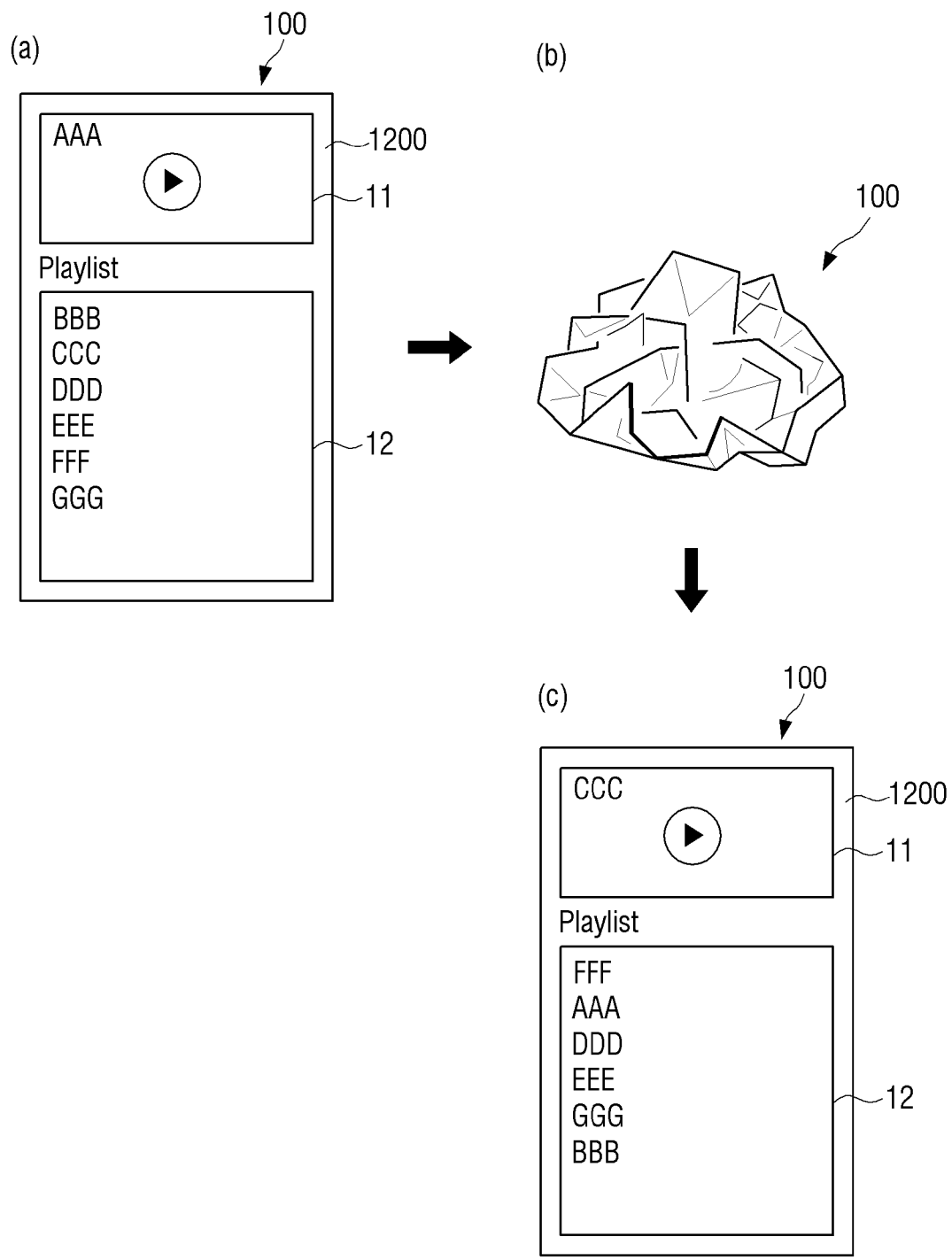

FIG. 12 is a view illustrating another example of an operation performed when crumpling occurs. Referring to FIG. 12, the flexible apparatus 100 may execute a content playback program to play back one of a plurality of contents. The controller 130 controls the screen generator 120 and the display 150 to generate and display a content playback screen 1200 by executing the content playback program (a).

The content playback screen 1200 includes a playback area 11 on which information on a currently played back content and a control menu are displayed and a playlist area 12 on which information on contents to be played back is displayed.

In this state, when the flexible apparatus is crumpled (b) and then is spread (c), the controller 130 performs a shuffling operation to rearrange the playback order of the contents. By performing the shuffling operation, the content which is being played back and the order of the contents in the playlist may be rearranged randomly. Accordingly, the contents displayed on the playback area 11 and the playlist area 12 of the content playback screen 1200 are changed.

Although the deleting operation and the shuffling operation are illustrated in the above example, a turn off operation may also be performed by crumpling. Specifically, when a home screen or a lock screen is displayed and crumpling occurs, the controller 130 removes the screen, shuts off the power supplied from a power source, and turns off the flexible apparatus 100.

Although FIGS. 10 to 12 illustrate the operation of the flexible apparatus 100 which includes the display 150, the flexible apparatus 100 may also include a beam projector in addition to or instead of the display.

FIG. 13 is a view illustrating an operation of a flexible apparatus which includes a beam projection function. Referring to FIG. 13, a flexible apparatus 100 may further include a beam projector 160 instead of the display 150.

The beam projector 160 includes a light source, an optical waveguide, and a lens. The beam projector 160 may be disposed on one side of the flexible apparatus 100. The controller 130 controls the beam projector 160 to emit beams for representing data on a UI screen generated by the screen generator 120. When a wall or a screen is scanned with the beams emitted from the beam projector 160, a UI screen 10 is displayed as shown in view (a) of FIG. 13.

A portion where the beam projector 160 is disposed may be made of a rigid material which is not flexible. On the other hand, the other portion where the beam projector 160 is not disposed may be made of a flexible material. When the flexible portion is crumpled, beams are emitted to display a screen 20 showing that the UI screen 10 is crumpled as shown in view (b) of FIG. 13.

FIG. 14 is a view illustrating an operation of a flexible apparatus which communicates with an external display apparatus. Referring to FIG. 14, the flexible apparatus 100 may further include a communicator 170. The communicator 170 encodes UI screen data generated by the screen generator 120 and transmits the UI screen data to a display apparatus 200. The communicator 170 may communicate with the display apparatus 200 in various types of wireless communication methods, such as Wi-Fi, Bluetooth, and radio frequency (RF) communication, or wire communication methods. The display apparatus 200 displays a UI screen 1410 based on the received UI screen data as shown in view (a) of FIG. 14.

In this state, when the flexible apparatus 100 is crumpled, the controller 130 of the flexible apparatus 100 controls the screen generator 120 to change the UI screen according to the crumpling. The communicator 170 transmits the changed UI screen data to the display apparatus 200. As shown in view (b) of FIG. 14, the display apparatus 200 displays a UI screen 1420 which is changed according to the UI screen data.

Although the UI screen data is generated in the flexible apparatus 100 and is transmitted to the display apparatus 200 in FIG. 14, the flexible apparatus 100 may also transmit a control command to change the UI screen according to crumpling to the display apparatus 200, and the display apparatus 200 may generate a UI screen according to the control command. In this case, the screen generator 120 may be omitted from the flexible apparatus 100. The control command may be set to different values according to various types of operations, such as a deleting operation, a turn off operation, and a shuffling operation, and may be stored in the storage 140.

Although the flexible apparatus 100 communicates with the display apparatus 200 in FIG. 14, the flexible apparatus 100 may also communicate with a beam projection apparatus and control the beam projector apparatus to emit beams corresponding to a UI screen.

In the above-described exemplary embodiment, the flexible apparatus 100 senses crumpling and performs an operation corresponding to the crumpling. However, this is merely an example and the operation of the flexible apparatus 100 may be controlled using local shape deformation other than the crumpling, such as pinching up or poking down. In order to sense the local shape deformation, such as pinching up or poking down, the plurality of sensors 110-1 to 110-n may be arranged throughout the overall surface of the flexible apparatus 100 as shown in FIG. 6.

FIGS. 15A, 15B, 16A and 16B are views illustrating various examples of local shape deformation.

Figure 15A:
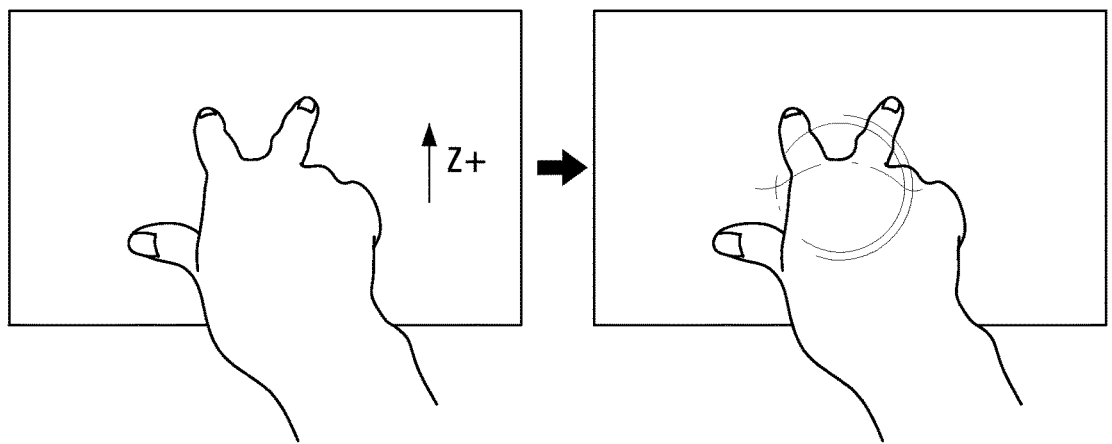
FIGS. 15A and 15B are views illustrating pinching up which is an example of local shape deformation of a flexible apparatus.
Figure 15B:
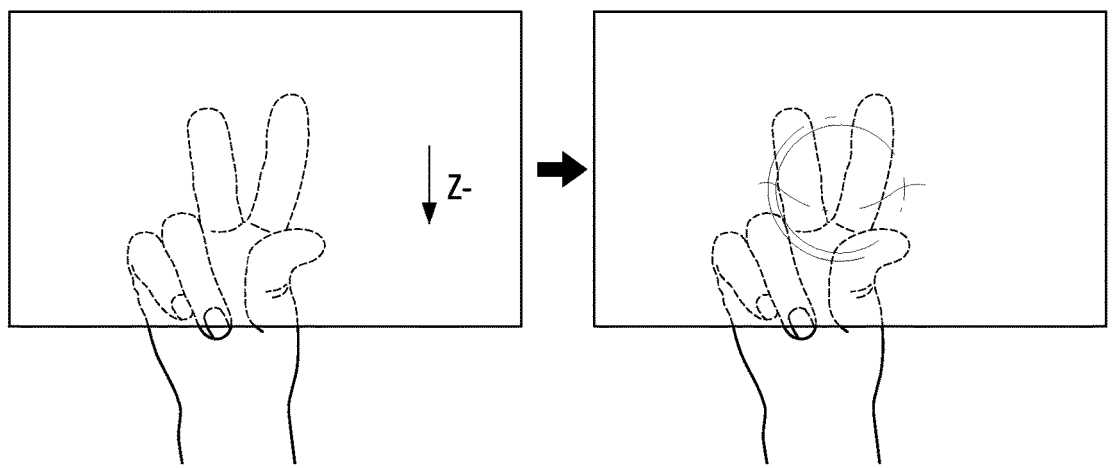

FIGS. 15A and 15B are views illustrating pinching up. The pinching up refers to a state in which the user picks up some areas of the surface of the flexible apparatus 100 using his/her fingers or other bodies or things, or a corresponding action.

Views of FIG. 15A illustrate an operation of picking up the surface of the flexible apparatus 100 in a first direction.

Views of FIG. 15B illustrate an operation of picking up the surface of the flexible apparatus 100 in a second direction which is opposite to the first direction. In FIG. 15A, the first direction is illustrated as a Z+ direction. In FIG. 15B, the second direction which is opposite to the first direction is illustrated as a Z− direction. As shown in FIGS. 15A and B, the pinching up may be performed in a front surface direction or a rear surface direction of the flexible apparatus 100. Since the direction of the pinching up varies according to a level of a sensing value of the sensor in a corresponding area, the direction of the pinching up may be determined based on the level of the sensing value.

Figure 16A:
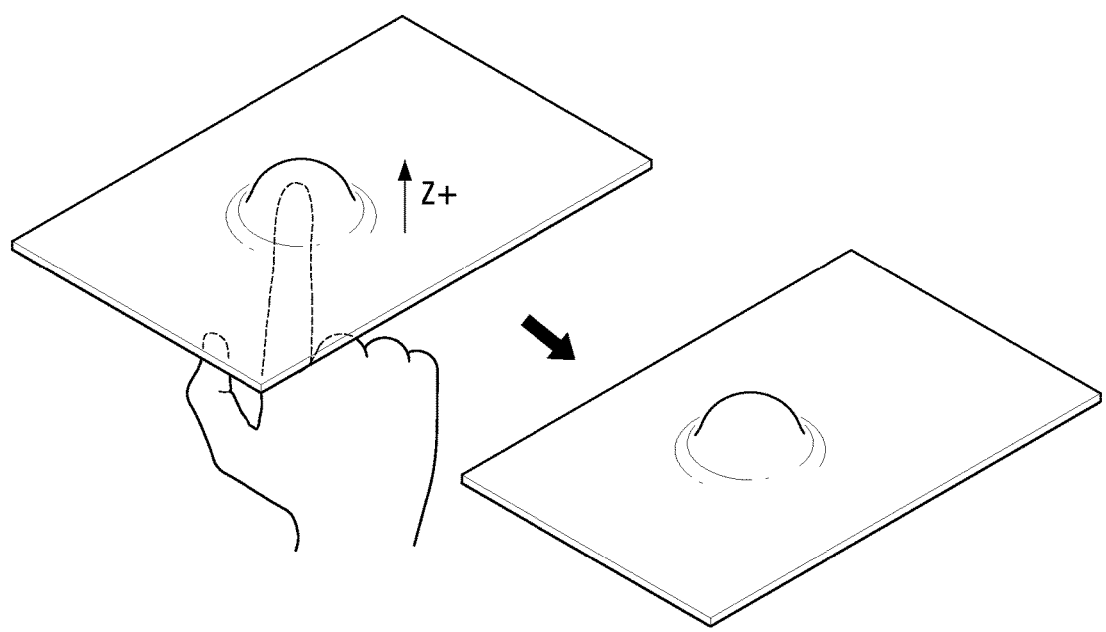
FIGS. 16A and 16B are views illustrating poking down which is another example of local shape deformation of a flexible apparatus.
Figure 16B:
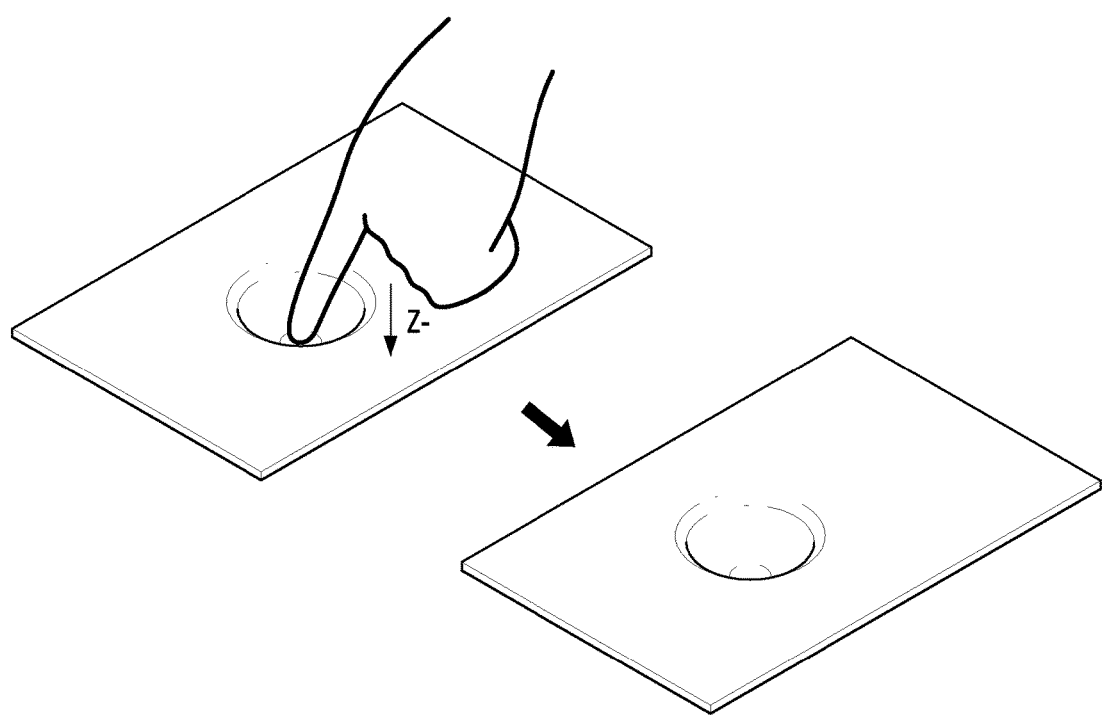

FIGS. 16A and 16B are views illustrating poking down. The poking down refers to a state in which the user presses down some areas of the surface of the flexible apparatus 100 using his/her fingers or other bodies or things, or a corresponding action. Views of FIG. 16A illustrate a state in which the user presses the rear surface of the flexible apparatus 100 and deforms its shape such that the pressed area of the surface of the flexible apparatus 100 protrudes in the Z+ direction. On the other hand, views of FIG. 16B illustrate a state in which the user presses the front surface of the flexible apparatus 100 and deforms its shape such that the pressed area of the surface of the flexible apparatus 100 is depressed in the Z− direction. The direction of the poking down may also be determined based on a level of sensing value of a sensor in a corresponding area.

In FIGS. 15A, 15B, 16A and 16B, when the pinching up or poking down is performed, the surface of the flexible apparatus 100 rises up or is sunken in an arch shape. However, the deformation shape may vary according to flexibility of the flexible apparatus 100. When the flexibility of the flexible apparatus 100 is small, a single bending line may be formed with reference to a location of the pinching up or poking down. That is, only the portion that the user holds with his/her two fingers is locally folded. When the user holds his/her three fingers, a plurality of bending lines may be locally formed and overlap one another. On the other hand, when the flexibility of the flexible apparatus 100 is great, the surface of the flexible apparatus 100 curves upwardly or downwardly with reference to the location of the pinching up or poking down as shown in FIGS. 15 and 16.

In order to sense local shape deformation, the sensors may be arranged throughout the overall surface of the flexible apparatus 100 as shown in FIG. 6. In this state, when pinching up or poking down occurs, the shape deformation is sensed only by the sensors of a local area from among all of the sensors. When it is determined that the sensors outputting sensing values are collected in an area except for an edge area of the flexible apparatus 100, the controller 130 may determine that local shape deformation occurs.

Figure 17:
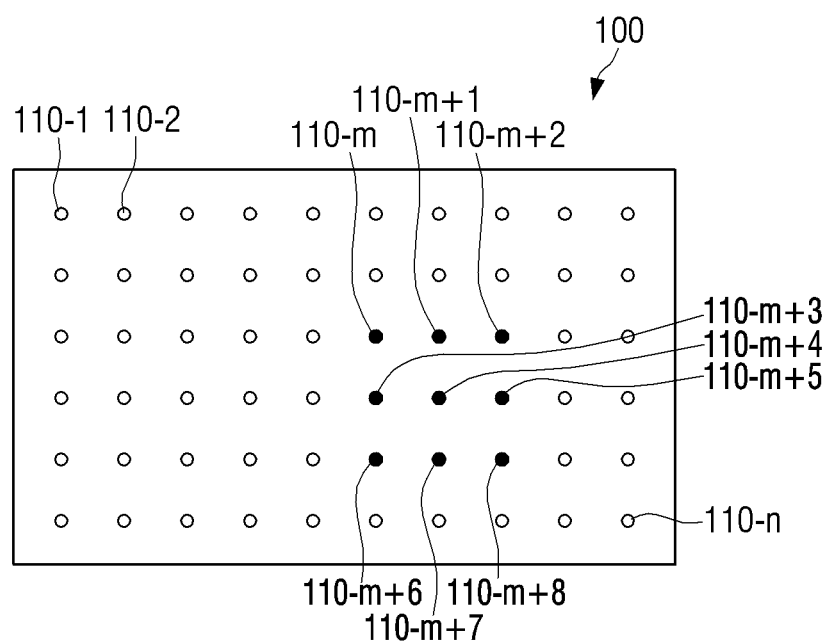
FIG. 17 is a view illustrating a method for sensing local shape deformation using a plurality of sensors.

FIG. 17 illustrates sensors which sense local shape deformation such as pinching up or poking down. Referring to FIG. 17, sensing values are output from only some sensors 110-$m$ to 110-$m$+8 from among all of the sensors 110-1 to 110-$n$.

When sensing values are output from only the sensors of a local area as shown in FIG. 17, the controller 130 may determine that pinching up or poking down occurs in the corresponding area. The controller 130 may distinguish between the pinching up and the poking down using a touch sensor (not shown) included in the flexible apparatus 100. For example, since the user should pick up the surface using at least two fingers to perform pinching up, a touch occurs in at least two locations. On the other hand, since it is common that the poking down is performed by one finger, a touch occurs in a single location. The condition for determining pinching up or the condition for determining poking down may be stored in the storage 140.

The controller 130 combines results of sensing by the sensors and results of sensing by the touch sensor, compares the combined results and the determining condition stored in the storage 140, and determines whether pinching up or poking down occurs.

When pinching up or poking down occurs, the controller 130 may control the screen generator 120 to change a UI screen according to the pinching up or poking down. When the pinching up or poking down occurs, the controller 130 may perform an operation corresponding to the pinching up or poking down. Specifically, the controller 130 may perform various operations, such as an operation of magnifying or reducing an object displayed at a point where the pinching up or poking down occurs, an operation of copying the object displayed at the corresponding point, an operation of pasting the copied object on a clip board area, an operation of increasing or reducing a number displayed at the corresponding point, an operation of displaying detailed information on the object displayed at the corresponding point, an operation of displaying an adjustment menu on the object displayed at the corresponding point, an operation of deleting the object displayed at the corresponding point, an operation of executing a program corresponding to the object displayed at the corresponding point, and an operation of transmitting content corresponding to the object displayed at the corresponding point to an external apparatus. The screen generator 120 may change only an area of the UI screen where pinching up or poking down occurs according to a kind of an operation performed by the controller 130.

In the above-described various exemplary embodiments, all of the crumpling, pinching up, and poking down are recognized. However, only the local shape deformation except for the crumpling may be sensed according to a configuration or material of the flexible apparatus 100. Specifically, according to another exemplary embodiment, the flexible apparatus 100 may include a display 150, a plurality of sensors 110-1 to 110-$n$ arranged throughout the overall surface of the display 150, a controller 130 configured to determine whether pinching up to pick up a local area of the display 150 or poking down to press down a local area occurs based on a result of sensing by the sensors 110-1 to 110-$n$, and a screen generator 120 configured to generate a UI screen changed according to a result of determining by the controller 130. The sensors 110-1 to 110-$n$ may be arranged as shown in FIG. 17.

In this exemplary embodiment, the flexible apparatus 100 may further include an additional element, such as the storage 140 configured to store various data and programs including the determining condition for determining the pinching up or poking down. Since illustration and explanation of the flexible apparatus for sensing the pinching up or poking down except for the crumpling are the same as those of the flexible apparatus in the above-described exemplary embodiments, a redundant explanation is omitted.

In order to sense pinching up or poking down, the flexible apparatus 100 is not required to be bent, and only a surface may be made of a flexible material and thus shape deformation may occur only on the surface. Accordingly, the sensors may be implemented using touch sensors embedded in the display other than the strain gages as described above.

FIG. 18 is a cross section view illustrating a configuration of a display 150 of a flexible apparatus, in which shape deformation occurs only on a surface according to an exemplary embodiment. Referring to FIG. 18, the display 150 includes a first protection layer 151, a display panel 152, a touch sensor 153, and a second protection layer 152.

The display panel 152 may be implemented by using various types of panels as described above.

The first protection layer 151 is stacked on a first surface of the display panel 152. The first protection layer 151 is made of a flexible material and has its shape changed locally when the user performs pinching up on the display panel 152. Specifically, the first protection layer 151 may be made of transparent silicon or transparent high molecular material.

The second protection layer 154 is made of a flexible material and stacked on a second surface of the display panel 152. Since the second protection layer 154 is opposite to the display screen, it is not required to be made of a transparent material.

The touch sensor 153 may be disposed between the display panel 152 and the second protection layer 154. The touch sensor 153 may be implemented by using various types of sensors, such as a capacitive type or a resistive type of sensor. The capacitive type calculates touch coordinates by sensing minute electricity excited in a user's body when a part of the user's body touches the surface of the display 150, using a dielectric substance coated on the surface of the display 150. The resistive type includes two electrode plates, and, when a user touches a screen, calculates touch coordinates by sensing an electric current flowing due to contact between upper and lower plates at the touched point. Besides these, infrared beam, surface acoustic wave, integral strain gauge, and piezo electric may be used to sense a touch manipulation.

Figure 19:
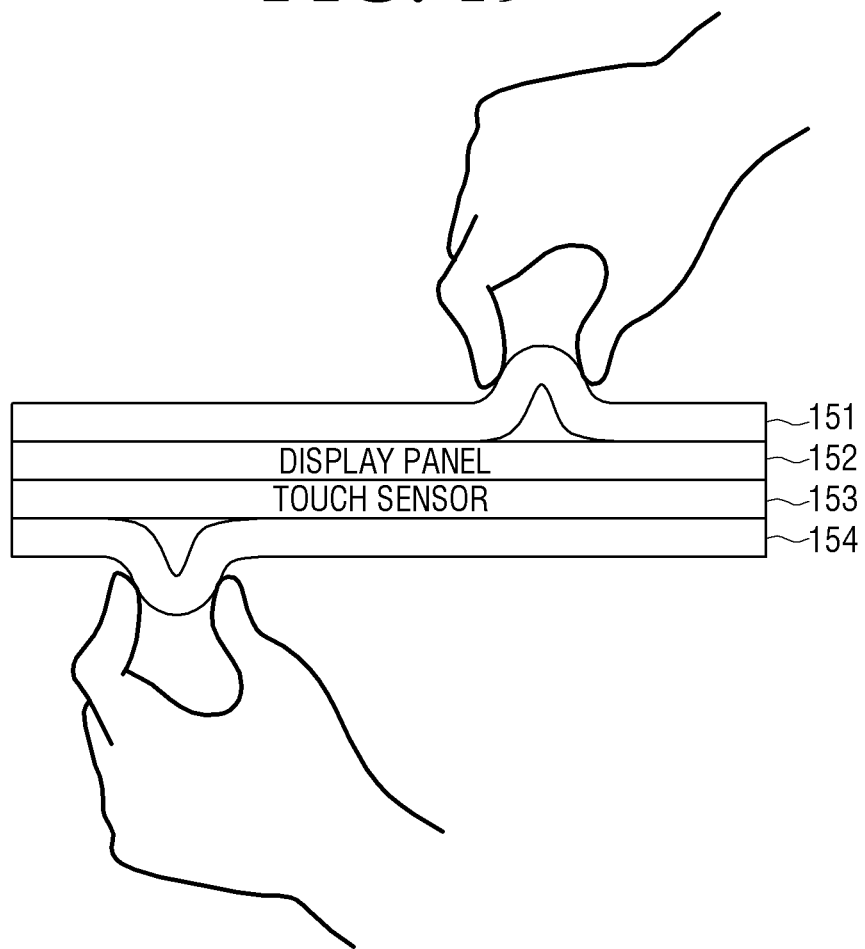
FIG. 19 is a view illustrating a state in which local shape deformation occurs in the display of FIG. 18.

FIG. 19 is a view illustrating a method for sensing pinching up on the display of the configuration shown in FIG. 18.

When pinching up occurs in the first direction, that is, the Z+ direction which is perpendicular to the surface of the flexible apparatus 100, the first protection layer 151 is separated from the first surface of the display panel 152 at the point where the pinching up occurs. When pinching up occurs in the second direction which is opposite to the first direction, that is, the Z− direction, the second protection layer 154 is separated from the second surface of the display panel 152 at the point where the pinching up occurs.

The touch sensor 153 senses touch and separation between the first protection layer 151 or the second protection layer 154 and the display panel 152 on each area, and outputs the result of sensing to the controller 130. The controller 130 may determine a point where pinching up occurs based on the result of sensing by the touch sensor 153.

In the exemplary embodiments of FIGS. 18 and 19, an existing display panel 152 which is not flexible may be used as the display panel 152.

The controller 130 may perform a different control operation according to which of pinching up and poking down occurs and a direction thereof. Accordingly, the flexible apparatus 100 may support various services. For example, when a person's face image is displayed on the flexible apparatus 100, the user may perform an editing operation, such as changing a shape or color of some areas of the face image by pinching some areas of the face image and pulling them, or poking a surface parallel. Also, the flexible apparatus 100 may be used in children's teaching aids or realistic advertisements.

In the above example, the pinching up and the poking down are distinguished and a different operation is performed. Hereinafter, various examples of changing a screen will be explained with reference to an operation performed when pinching up occurs.

Figure 20:
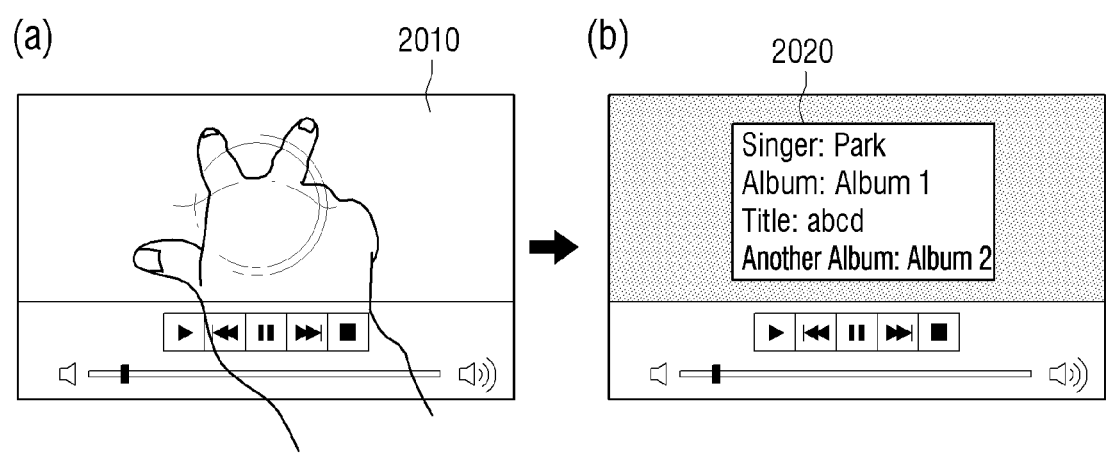

FIG. 20 is a view illustrating an operation when pinching up occurs in the first direction. As shown in view (a) of FIG. 20, the user may perform pinching up in the first direction, that is, on the front surface of the flexible apparatus 100, when a playback screen 2010 of music content is displayed. In this case, detailed information 2020 on the music content being played back may be displayed as shown in view (b) of FIG. 20. The detailed information 2020 may include a variety of information such as information on a singer of the music content, album information, title information, and information on relevant music contents (for example, another music content information in the same album). The detailed information 2020 may be displayed at a point where the pinching up occurs. When it is determined that the pinching up occurs, the controller 130 may control the screen generator 120 to generate the detailed information 2020 and add it to the playback screen 2010 as shown in view (b) of FIG. 20.

Figure 21:
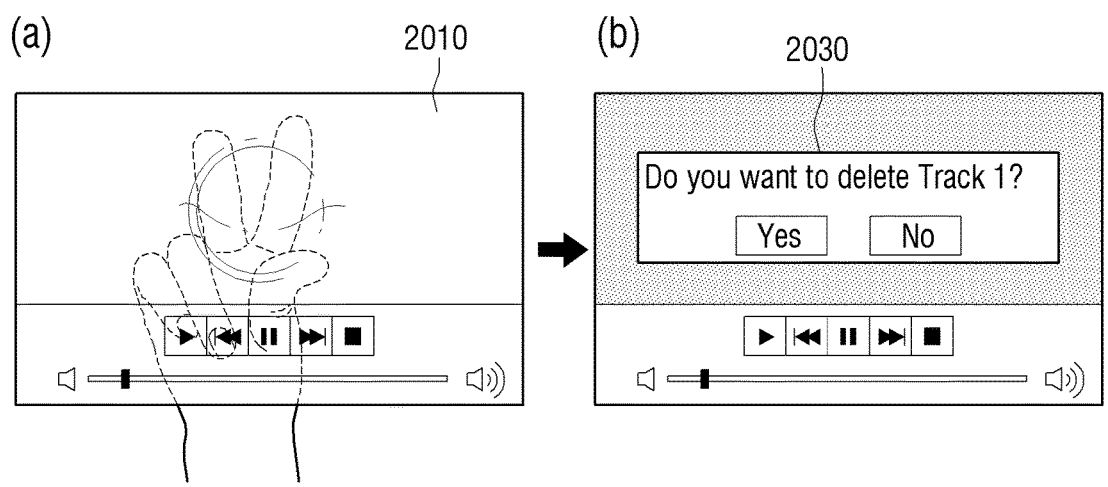

FIG. 21 is a view illustrating an operation when pinching up occurs in the second direction. In the same way as in FIG. 20, the user may perform pinching up in the second direction, that is, on the rear surface of the flexible apparatus 100, when the playback screen 2010 of the music content is displayed (view (a) of FIG. 21). In this case, the controller 130 recognizes that a command to delete the content being played back is input, and controls the screen generator 120 to add an inquiry screen 2030 to inquire about whether the user want to delete the content. When the user selects Yes, the controller 130 deletes the content stored in the storage 140.

As shown in FIGS. 20 and 21, the flexible apparatus 100 may display the detailed information or delete the content according to the pinching up or poking down. Although the detailed information displaying operation or content deleting operation corresponds to a single UI screen in FIGS. 20 and 21, such operations may be performed on a basis of an object which is displayed on the single UI screen.

Figure 22:
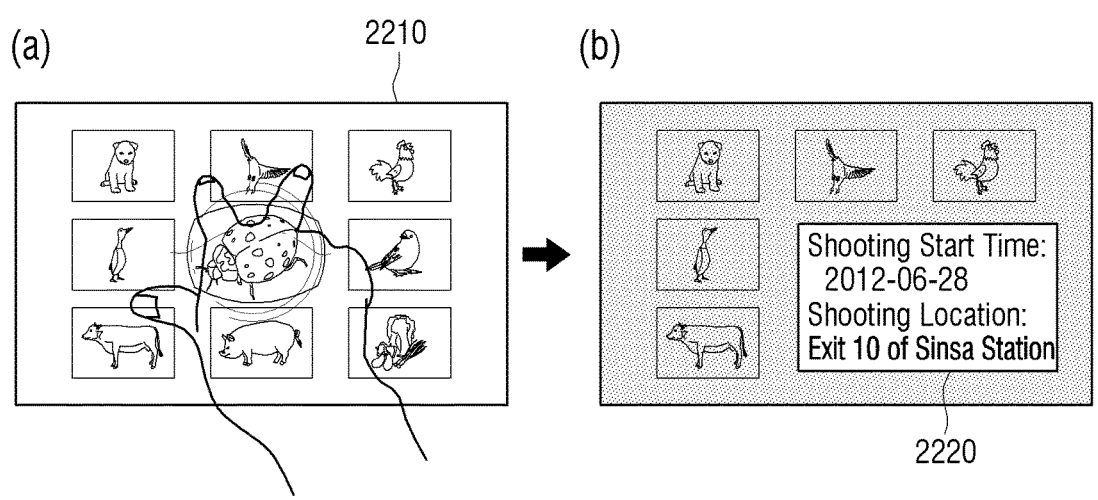

FIG. 22 is a view illustrating another example of an operation when pinching up occurs in the first direction. When a UI screen 2210 including a plurality of objects is displayed and pinching up is performed at a point where at least one object is displayed in the first direction as shown in view (a) of FIG. 22, the controller 130 detects coordinate values of the point where the pinching up occurs, compares the coordinate values and display coordinate values of each object displayed on the UI screen, and determines an object displayed at the pinching up point. The controller 130 reads out detailed information on the determined object from the storage 140, or retrieves the detailed information from an external source, and provides the detailed information to the screen generator 120. The screen generator 120 displays the detailed information 2220 on the UI screen as shown in view (b) of FIG. 22.

Figure 23:
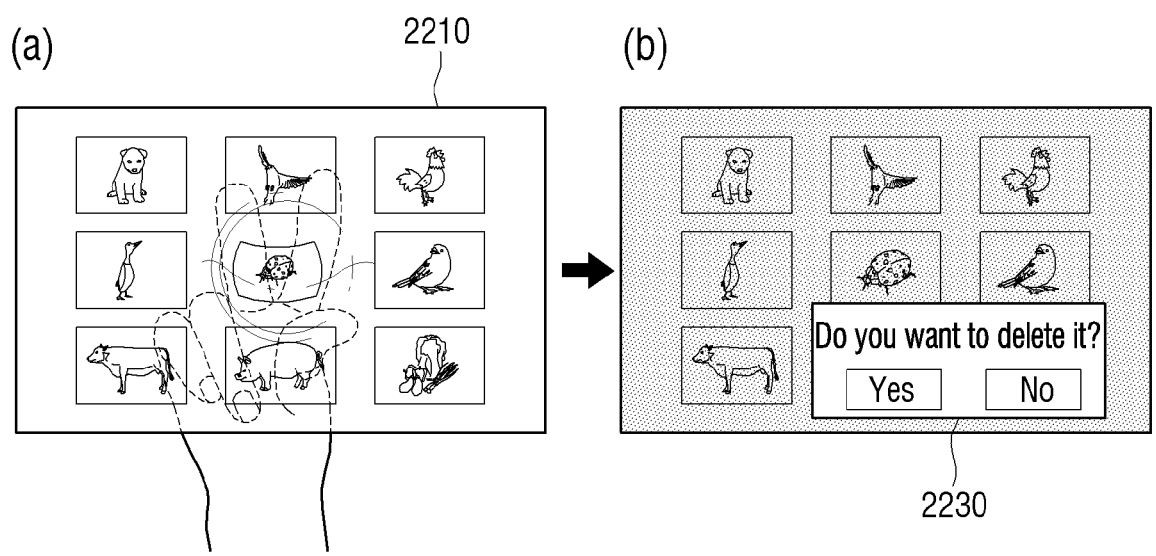

FIG. 23 is a view illustrating another example of an operation when pinching up occurs in the second direction. Referring to view (a) of FIG. 23, when the UI screen 2210 including the plurality of objects is displayed and pinching up is performed at a point where at least one object is displayed in the second direction, the controller 130 determines the object displayed at the point where the pinching up occurs, and controls the screen generator 120 to generate an inquiry screen 2230 to inquire about whether the user wants to delete the determined object. Accordingly, the inquiry screen 2230 is displayed at the point where the pinching up occurs as shown in view (b) of FIG. 23. The user may delete the corresponding object by selecting a Yes menu. In FIGS. 22 and 23, the objects may be displayed in the form of thumbnail. However, the object is not limited to an image and may be represented by a text or an icon. In particular, when pinching up occurs on one icon on a home screen or an icon screen on which a plurality of icons are displayed, the controller 130 may perform an operation of displaying detailed information on a program corresponding to the icon or an operation of deleting or uninstalling the program.

On the other hand, when local shape deformation occurs, the controller 130 may perform an operation of magnifying or reducing a size of an object displayed at a point of the shape deformation. A time at which the object is magnified or reduced or an adjusting ratio may be determined differently according to characteristics of the pinching up or poking down.

FIGS. 24 and 25 are views illustrating a method for locally magnifying or reducing a screen in a flexible apparatus according to an exemplary embodiment.

When a UI screen 2400 is displayed as shown in view (a) of FIG. 24, the user may perform pinching up on a local area in the screen in the first direction. The controller 130 identifies a point where the pinching up occurs and specifies an area of the whole screen 2400 where the pinching up occurs. The controller 130 controls the screen generator 120 to magnify only the specified screen area 2410.

The user may move the pinching up location. View (b) of FIG. 24 illustrates the pinching up location being moved. As the pinching up location is moved, the magnified area of the screen is changed in a direction corresponding to the movement (2420).

Also, the user may perform pinching up at a plurality of points using his/her both hands. When the user performs pinching up at two points as shown in view (c) of FIG. 24, screen areas 2420 and 2430 of the corresponding points are magnified and displayed.

In view (a) of FIG. 24, a single image is displayed on the whole UI screen 2400. However, when a plurality of objects are displayed as shown in FIGS. 22 and 23, and pinching up is performed on one object, only the object may be magnified or reduced.

When a UI screen 2500 is displayed as shown in view (a) of FIG. 25, the user may perform pinching up on a local area in the screen in the second direction. The controller 130 identifies a point where the pinching up occurs and specifies an area of the whole screen 2500 where the pinching up occurs. The controller 130 controls the screen generator 120 to reduce only the specified screen area 2510.

The user may move the pinching up location as shown in view (b) of FIG. 25. As the pinching up location is moved, the reduced area of the screen is changed in a direction corresponding to the movement (2520).

Also, the user may perform pinching up at a plurality of points using his/her both hands. When the user performs pinching up at two points as shown in view (c) of FIG. 25, screen areas 2520 and 2530 of the corresponding points are reduced and displayed.

FIG. 26 is a view illustrating another example of a method for magnifying only an object when pinching up occurs on the object.

Referring to FIG. 26, the flexible apparatus 100 may display a map 2610. Although a simple map is illustrated in FIG. 26, a navigation screen may also be displayed.

The user may pinch up a specific region on the map 2610 as shown in view (a) of FIG. 26. The controller 130 controls the screen generator 120 to generate point of information (POI) 2620 and display the POI at the point where the pinching up is sensed. The POI refers to a variety of information on the point where the pinching up occurs. Referring to view (b) of FIG. 26, the POI 2620 is represented as if a magnifying glass is placed at the corresponding point, and magnifies the object of that point and displays the object.

According to still another exemplary embodiment, the controller 130 may change contents displayed on the UI screen according to local shape deformation, rather than changing the shape of the UI screen.

Figure 27:
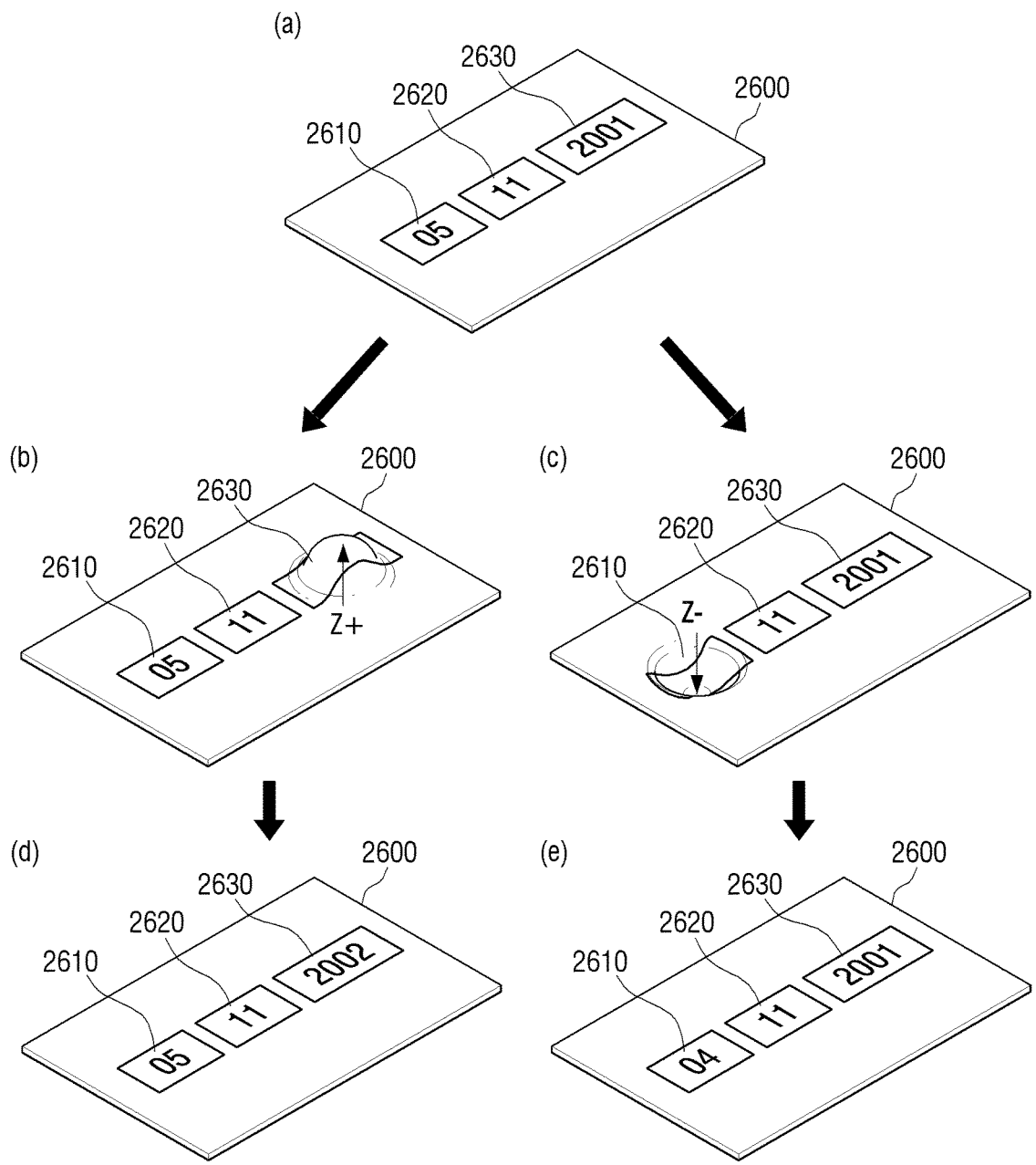

FIG. 27 is a view illustrating an example of an operation of a flexible apparatus of changing contents of a UI screen. Referring to view (a) of FIG. 27, the flexible apparatus 100 displays a UI screen 2600 including objects 2610, 2620, and 2630. The objects 2610, 2620, and 2630 may be displayed in the form of an input window through which various characters, such as letters or numbers, are input. In FIG. 27, the objects 2610, 2620, and 2630 are in the form of an input window to input month, day, and year, respectively.

The user may pinch up a portion of the object(s) that the user wishes to adjust from among the objects 2610, 2620, and 2630. View (b) of FIG. 27 illustrates the third object 2630 which is pinched up in the Z+ direction. The controller 130 increases the number displayed on the pinched up object 2630 according to a degree of pinching up or a pinching up holding time. In view (d) of FIG. 27, 2001 increases to 2002.

On the other hand, the user may decrease the number by pinching up in the Z− direction. That is, when the first object 2610 is pinched up in the Z− direction as shown in view (c) of FIG. 27, the number 05 decreases to 04 as shown in view (e) of FIG. 27. When setting the numbers is completed, the controller 130 may store the set numbers in the storage 140.

Although a manipulation to increase or decrease the number is illustrated in FIG. 27, letters may be changed in the same way. For example, when pinching up is performed at a point where a letter is displayed in the Z+ direction, the letter is changed from A to Z in sequence with reference to alphabetical order. When pinching up is performed in the Z− direction, the letter is changed from Z to A in sequence.

In the above-described exemplary embodiments, detailed information is displayed according to local shape deformation. However, a manipulation menu on the corresponding object may also be displayed in addition to the detailed information.

FIG. 28 is a view illustrating an operation of a flexible apparatus of displaying a menu according to local shape deformation. When a UI screen 2800 including a plurality of objects 2810 to 2860 is displayed as shown in view (a) of FIG. 28, and the user pinches up the 5th object 2850 in the Z+ direction as shown in view (b) of FIG. 28, shape deformation in which the corresponding point rises up is performed.

The controller 130 may compare coordinates values of the point where the pinching up is performed and display coordinates of each object in the UI screen 2800, and determine that the 5th object 2850 is pinched up. The controller 130 reads out information on main menus (A, B, C, and D) and sub menus (a, b, and c) which may be manipulated for the 5th object 2850 from the storage 140, and controls the screen generator 120 to generate a first circular UI 2870 and a second circular UI 2880 using the read out information.

As shown in view (c) of FIG. 28, the first circular UI 2870 may be formed in a circular shape with reference to the point where the pinching up is performed. The 5th object 2850 may be displayed on a center area of the first circular UI 2870. The second circular UI 2880 is formed around the first circular UI 2870. The second circular UI 2880 may display sub menus belonging to each main menu (A, B, C, or D) displayed on the first circular UI 2870. When one main menu is selected, the second circular UI 2880 may be displayed around the main menu. For example, when the main menu D is an editing menu, the second circular UI 2880 may include sub menus belonging to the editing menu, such as a copying menu, a deleting menu, and a scaling menu. In the above-described exemplary embodiment, the second circular UI 2880 is displayed when the main menu is selected. Alternatively, the second circular UI 2880 may be displayed at the same time of displaying the first circular UI 2870 when pinching up occurs.

As described above, the flexible apparatus 100 may locally change the UI screen according to local shape deformation, such as pinching up or poking down. In FIGS. 20 to 28, the operations performed when pinching up occurs have been described for convenience of explanation. However, when poking down occurs, the same operations as explained in FIGS. 20 to 28 may be performed. Also, the operation may be performed according to a direction of shape deformation without distinguishing between pinching up and poking down. For example, a first operation may be mapped onto pinching up or poking down in the Z+ direction, and a second operation may be mapped onto pinching up or poking down in the Z− direction.

Figure 29:
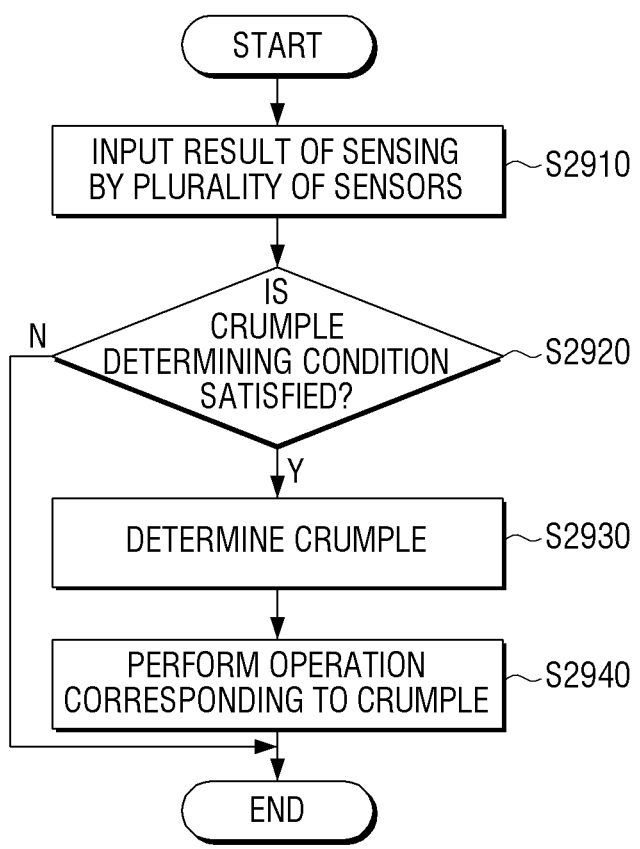
FIG. 29 is a flowchart illustrating a control method of a flexible apparatus according to an exemplary embodiment.

FIG. 29 is a flowchart illustrating a control method of a flexible apparatus according to an exemplary embodiment. Referring to FIG. 29, when a result of sensing by the plurality of sensors is input (S2910), the flexible apparatus 100 determines whether the result of the sensing satisfies a pre-stored crumple determining condition (S2920). When it is determined that the result of the sensing satisfies the crumple determining condition (S2920-Y), the flexible apparatus 100 determines that crumpling occurs (S2930) and performs an operation corresponding to the crumpling (S2940). The crumple determining condition may be set as various values and stored as described above. Also, an operation performed when the crumpling occurs may vary according to an exemplary embodiment. The detailed description of this has been provided and a redundant explanation is omitted.

In FIG. 29, the method for determining crumpling and controlling an operation according to the crumpling has been described. However, according to another exemplary embodiment, the flexible apparatus may determine local shape deformation other than crumpling, such as pinching up or poking down, and may control an operation.

Specifically, a control method performing in sequence: displaying a UI screen, determining whether pinching up or poking down occurs based on a result of sensing by a plurality of sensors which are arranged on the display; and, when it is determined that the pinching up or poking down occurs, performing a corresponding operation and locally changing the UI screen may be implemented.

A flowchart on such a control method is omitted. Also, the method for determining pinching up or poking down and performing a corresponding operation, and a kind of the UI screen have been described above with reference to FIGS. 20 to 28, and thus a redundant explanation is omitted.

According to still another exemplary embodiment, various types of shape deformation, such as normal bending, crumpling, pinching up, and poking down, may be sensed.

Figure 30:
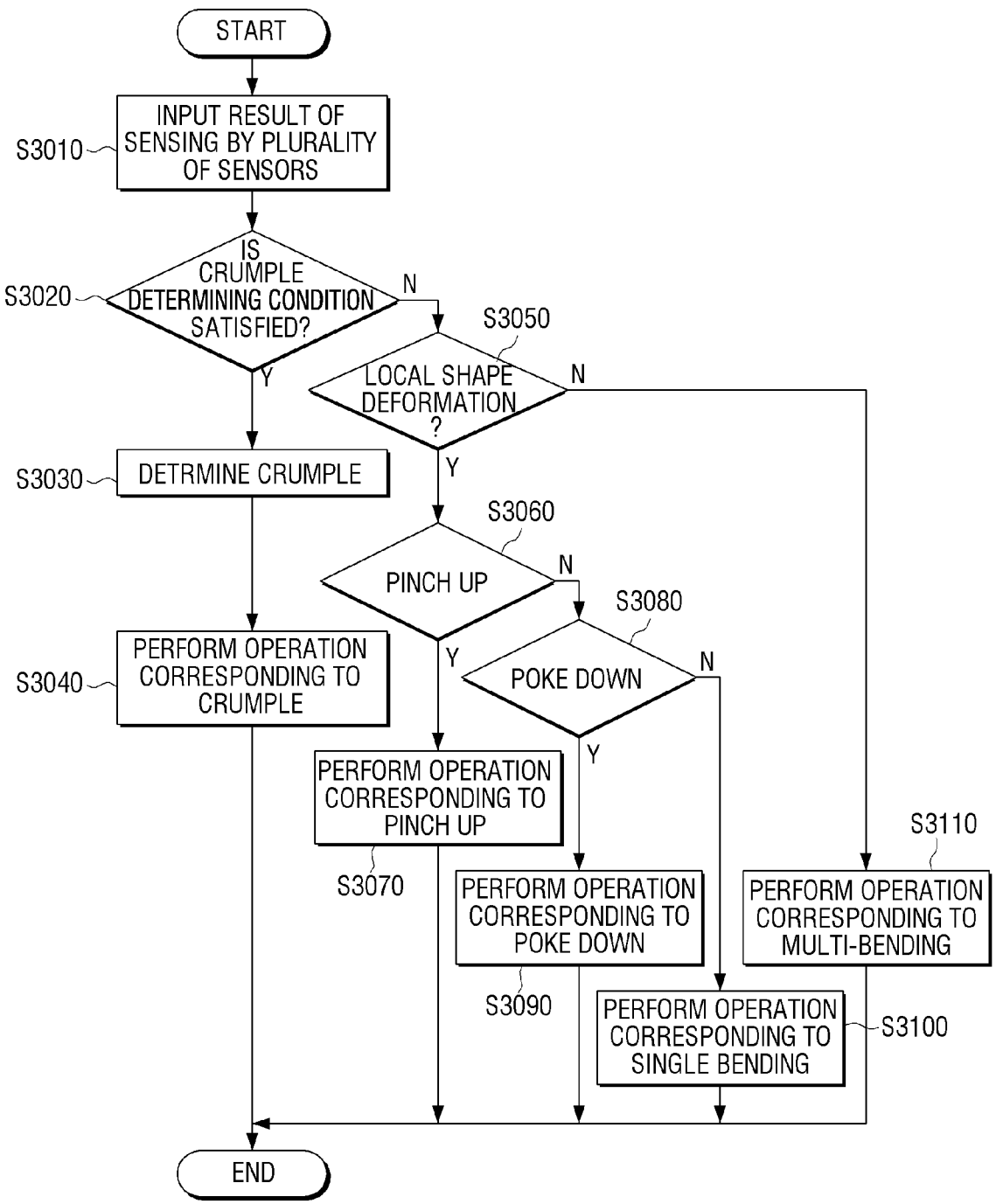
FIG. 30 is a flowchart illustrating a control method of a flexible apparatus according to various exemplary embodiments.

FIG. 30 is a flowchart illustrating a control method of a flexible apparatus according to still another exemplary embodiment.

Referring to FIG. 30, when a result of sensing by the plurality of sensors is input (S3010), the flexible apparatus determines whether the result of the sensing satisfies a crumple determining condition (S3020). When the crumple determining condition is satisfied, it is determined that crumpling occurs (S3030) and an operation corresponding to the crumpling is performed (S3040).

On the other hand, when it is determined that the crumple determining condition is not satisfied (S3020), it is determined whether local shape deformation occurs (S3050) based on whether the shape deformation is sensed from a limited part of the whole area.

When it is determined that the local shape deformation occurs, it is determined whether the shape deformation is pinching up or poking down (S3060 and S3080) according to a number of touch points.

When it is determined that the shape deformation is pinching up, the flexible apparatus performs an operation corresponding to the pinching up (S3070). On the other hand, when it is determined that the shape deformation is poking down, the flexible apparatus performs an operation corresponding to the poking down (S3090). The operation corresponding to the pinching up and the operation corresponding to the poking down may vary according to a direction of each shape deformation. For example, a copying operation is performed when the pinching up is performed in the first direction, and a pasting operation is performed when the pinching up is performed in the second direction. Also, a magnifying operation is performed when the poking down is performed in the first direction, and a reducing operation is performed when the poking down is performed in the second direction. A mapping relationship between these operations and the types of shape deformation may be pre-stored in the flexible apparatus.

When it is determined that local shape deformation occurs, but the local shape deformation is neither pinching up nor poking down, it may be determined that single bending in which a corner or an edge is locally bent occurs. Accordingly, an operation corresponding to the single bending may be performed (S3100). For example, separate screens may be displayed on a bent corner or edge and the other area, or the bent corner or edge may be inactivated. Besides these, various operations, such as displaying a clip board area, pausing playback of content, and inserting a bookmark, may be mapped onto the single bending.

Also, when shape deformation occurs at a plurality of points, but the crumple determining condition is not satisfied and it is determined that the shape deformation is not local shape deformation, it may be determined that multi-bending occurs. Accordingly, an operation corresponding to the multi-bending may be performed (S3110). The multi-bending refers to a state in which one of distinguishable areas such as upper, lower, left and right edges or 4 corners is bent along with at least one of the other areas. When multi-bending is performed, the flexible apparatus performs an operation mapped onto the multi-bending. For example, when the flexible apparatus includes the display 150 as shown in FIG. 9, and the left edge and the right edge are bent such that the display 150 is divided into three equal parts, three screens are displayed. Also, when the left upper corner, the right upper corner, the left lower corner, and the right lower corner are all bent, a UI screen of a different function may be displayed on each of the corners. Besides theses, various operations may be mapped onto areas, respectively, and may be supported.

As described above, the flexible apparatus may be implemented in various forms, such as a flexible display apparatus including a display function, a beam projector apparatus including a beam projection function, and a user terminal apparatus including a function of controlling an external display apparatus.

Figure 31:
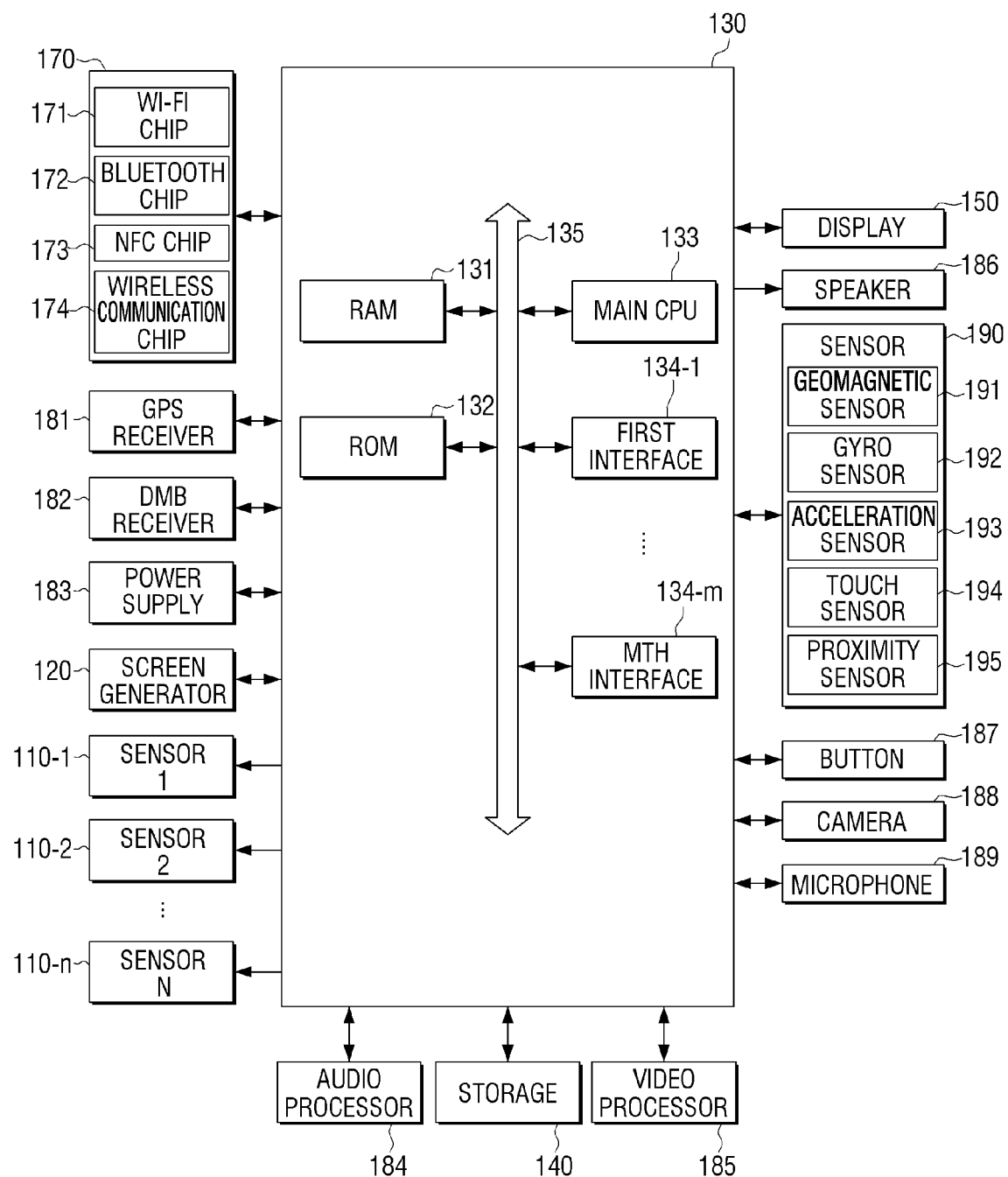
FIG. 31 is a block diagram illustrating a configuration of a flexible apparatus according to various exemplary embodiments.

FIG. 31 is a block illustrating an example of a detailed configuration of a flexible apparatus implemented by using a user terminal apparatus including a communication function and a display function.

Referring to FIG. 31, the flexible apparatus 100 includes a plurality of sensors 110-1 to 110-n, a screen generator 120, a controller 130, a storage 140, a display 150, a communicator 170, a GPS receiver 181, a DMB receiver 182, a power supply 183, an audio processor 184, a video processor 185, a speaker 186, a button 187, a camera 188, a microphone 189, and a sensor 190.

The screen generator 120 displays various types of UI screens as described above, and, when crumpling, pinching up, or poking down occurs, wholly or locally changes the UI screen according to the shape deformation.

The display 150 displays the UI screen generated by the screen generator 120.

The storage 140 stores various programs and data used in the flexible apparatus 100. In particular, the storage 140 may store information on operations mapped onto various types of shape deformation, such as crumpling, pinching up, poking down, normal bending, twist, and shaking, and information on a determining condition for determining various types of shape deformation.

The plurality of sensors 110-1 to 110-n are implemented in various forms as described above and sense shape deformation.

The controller 130 controls an overall operation of the flexible apparatus 100 using various programs and data stored in the storage 140. The controller 130 compares a result of sensing by the plurality of sensors 110-1 to 110-n and the determining condition, determines what shape deformation is performed, and performs an operation according to operation information mapped onto the shape deformation. A detailed configuration and an operation of the controller 130, and a configuration of the storage 140 will be explained in detail below.

The sensor 190 includes sensors other than the sensors 110-1 to 110-n for sensing shape deformation. The sensor 190 may include various sensors, such as a geomagnetic sensor 191, a gyro sensor 192, an acceleration sensor 193, a touch sensor 194, and a proximity sensor 195. The touch sensor 194 may be implemented in the form of the touch sensor 153 embedded in the display 150 as described above with reference to FIGS. 18 and 19. When various kinds of sensors are provided besides the strain gage or touch sensor as described above, the sensor 190 may sense various manipulations, such as rotation, tilt, pressure, and approach of the flexible apparatus.

The communicator 170 may communicate with various types of external apparatuses according to various communication methods. The communicator 170 may include various communication chips, such as a Wi-Fi chip 171, a Bluetooth chip 172, a near field communication (NFC) chip 173, and a wireless communication chip 174.

The Wi-Fi chip 171, the Bluetooth chip 172, and the NFC chip 173 communicate with external apparatuses in a Wi-Fi method, a Bluetooth method, and an NFC method, respectively. Among these, the NFC chip 173 is operated in the NFC method, which uses 13.56 MHz from among various RF-ID frequency bands, such as 135 kHz, 13.56 MHz, 433 MHz, 860~960 MHz, and 2.45 GHz. When the Wi-Fi chip 171 or the Bluetooth chip 172 is used, a variety of connection information, such as an SSID and a session key, is exchanged first and connection is established using the connection information, and then, a variety of information is exchanged. The wireless communication chip 174 communicates with external apparatuses according to various communication standards, such as IEEE, Zigbee, 3rd generation (3G), 3rd generation partnership project (3GPP), and long term evolution (LTE).

The communicator 170 includes at least one of the above-described various chips or a chip according to the other communication standards, and communicates with an external display apparatus using the same. Specifically, the communicator 170 may transmit UI screen data to an external display apparatus as explained with reference to FIG. 14. Also, when the flexible apparatus 100 executes a remote control function, the communicator 170 may transmit various control commands to external apparatuses under the control of the controller 130.

The GPS receiver 181 receives a GPS signal from a GPS satellite and calculates a current position of the flexible apparatus 100.

The DMB receiver 182 receives a digital multimedia broadcasting (DMB) signal and processes the signal.

The power supply 183 supplies power to the elements of the flexible apparatus 100. The power supply 183 may be implemented by including an anode collector, an anode electrode, an electrolyte, a cathode electrode, a cathode collector, and a sheath enclosing the aforementioned members. The power supply 183 may be implemented by using a secondary cell which is chargeable and dischargeable. The power supply 183 may be implemented in a flexible form so that the power supply 183 can be bent along with the flexible apparatus 100. In this case, the collector, the electrode, the electrolyte, and the sheath may be made of a flexible material.

The audio processor 184 refers to an element that processes audio data included in a content. The audio processor 184 performs various processing operations, such as decoding, amplifying, and noise filtering with respect to audio data.

The video processor 185 processes video data included in content. The video processor 185 may perform various image processing operations, such as decoding, scaling, noise filtering, frame rate conversion, and resolution conversion with respect to the video data.

The audio processor 184 and the video processor 185 may be driven when a program to play back content received from an external source or content stored in the storage 140 is executed. For example, when a program to play back multimedia content is executed, the controller 130 controls the screen generator 120 and the display 150 to generate and display a UI screen for selecting content. When a specific content is selected on the UI screen, the controller 130 drives the audio processor 184 and the video processor 185 to plays back the content.

The display 150 may display an image frame generated by the video processor 185. The speaker 186 may output audio data generated by the audio processor 184.

When a shuffling operation is mapped onto crumpling as described above, and crumpling is sensed while a content selection or playback screen is displayed, the controller 130 may perform the shuffling operation of rearranging a playback order of contents including a currently played back content.

The button 187 may be implemented by using various kinds of buttons, such as a mechanical button, a touch button, and a wheel, which are formed on a certain area of the flexible apparatus 100, such as a front surface, a side surface, and a bottom surface of a body of the flexible apparatus 100.

The camera 188 captures a still image or a moving picture according to control of the user. The camera 188 may be a plurality of cameras including a front camera and a rear camera.

The microphone 189 receives a user's voice or other sounds and converts the voice or sounds into audio data. The controller 130 may use a user's voice input through the microphone 189 for a call process, convert the voice input into audio data, and store the audio data in the storage 140.

When the camera 188 and the microphone 189 are provided, the controller 130 may perform a control operation according to a user's voice input through the microphone 189 or a user's motion recognized by the camera 188. That is, the flexible apparatus 100 may be operated in a motion control mode or a voice control mode. In the motion control mode, the controller 130 activates the camera 188, captures a user, traces a change in the user's motion, and performs a corresponding control operation. In the voice control mode, the controller 130 may perform voice recognition by analyzing a user's voice input through the microphone 189 and perform a control operation according to the analyzed user's voice. The flexible apparatus 100 supporting the motion control mode or the voice control mode may perform an operation of displaying and changing a UI screen according to a motion manipulation or a voice manipulation, besides the control operations using shape deformation, such as crumpling, pinching up, poking down, normal bending, multi-bending, and other bending.

The flexible apparatus 100 may further include various external input ports to connect the flexible apparatus 100 to various external terminals, such as a USB port, a headset, a mouse, and a local area network (LAN).

The above-described operation of the controller 130 may be performed by a program stored in the storage 140. The storage 140 may store operating system (OS) software for driving the flexible apparatus 100, various applications, programs, such as widgets, various data which is input or set when a program is executed, contents, mapping information between shape deformation and control operations, and information on a determining condition for each shape deformation.

The controller 130 may use various programs stored in the storage 140. The controller 130 includes a random access memory (RAM) 131, a read only memory (ROM) 132, a main CPU 133, first to nth interfaces 134-1~134-n, and a bus 135. The RAM 131, the ROM 132, the main CPU 133, and the first to the nth interfaces 134-1~134-n may be connected to one another through the bus 135.

The first to the nth interfaces 134-1~134-n are connected to the above-described various elements. One of these interfaces may be a network interface connected to an external apparatus through a network.

The main CPU 133 accesses the storage 140 and performs booting using the O/S stored in the storage 140. The main CPU 133 performs various operations using the various programs, content, and data stored in the storage 140.

The ROM 132 stores a set of commands to boot the system. When a turn on command is input and power is supplied, the main CPU 133 copies the O/S stored in the storage 140 to the RAM 131 according to a command stored in the ROM 132, executes the O/S and boots the system. When the booting is completed, the main CPU 133 copies the various programs stored in the storage 140 into the RAM 131, executes the programs copied into the RAM 131, and performs various operations. The main CPU 133 controls the screen generator 120 to render a UI screen according to a result of executing the program. When a result of sensing by the sensors 110-1 to 110-n is input, the main CPU 133 determines what kind of shape deformation is performed. When it is determined that crumpling is performed, the main CPU 133 outputs a control command to perform the operations shown in FIGS. 10 to 12 and other operations not illustrated to the elements including the screen generator 120. When it is determined that pinching up or poking down occurs, the main CPU 133 outputs a control command to perform the operations shown in FIGS. 20 to 28 and other operations not illustrated to the elements including the screen generator 120. Examples of these operations have been described above and a redundant explanation is omitted.

FIG. 31 illustrates various elements which are mountable in the flexible apparatus when the flexible apparatus is implemented by using a terminal apparatus that collectively supports various functions, such as a communication function, an auto rotation function, a DMB function, and a GPS receiving function. Accordingly, some of the elements illustrated in FIG. 31 may be omitted or changed, and another element may be added.

As described above, the controller 130 may perform various operations by executing a program stored in the storage 140.

Figure 32:
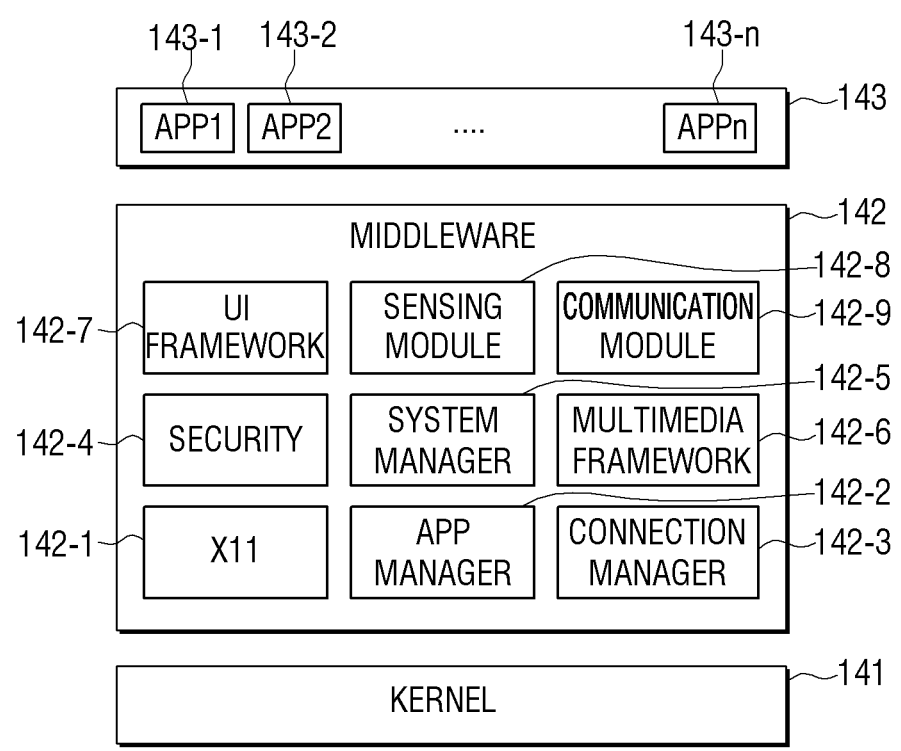
FIG. 32 is a view illustrating an example of a configuration of a program which is used in a flexible apparatus.

FIG. 32 is a view illustrating a hierarchy of software stored in the storage 140. Referring to FIG. 32, the storage 140 stores a kernel 141, middleware 142, and an application module 143.

The kernel 141 serves as a passage through which signals input from the sensors 110-1 to 110-n or various sensors included in the sensor 190, or signals input from other hardware elements are transmitted to the middleware 142.

The middleware 142 includes various software modules to control the operation of the flexible apparatus 100. Referring to FIG. 32, the middle ware 142 includes an X11 module 142-1, an APP manager 142-2, a connection manager 142-3, a security module 142-4, a system manager 142-5, a multimedia framework 142-6, a UI framework 142-7, a sensing module 142-8, and a communication module 142-9.

The X11 module 142-1 receives various events from various hardware elements included in the flexible apparatus 100. The event recited herein may include an event in which a touch, bending or other user manipulations are sensed, an event in which a system notice is generated, and an event in which execution of a specific program starts or ends.

The APP manager 142-2 is a module that manages execution states of various applications installed in the storage 140. When an event in which an application execution command is input is sensed from the X11 module 142-1, the APP manager 142-2 calls an application corresponding to the event and executes the application. For example, when pinching up is performed on one icon on an icon screen on which a plurality of icons are displayed, the APP manager 142-2 calls an application corresponding to an icon at the point where the pinching up occurs, and executes the application. Also, when a UI screen which is a result of executing a specific application is displayed and crumpling is performed, the APP manager 142-2 may finish executing the application.

The UI screen which is a result of executing the application called by the APP manager 142-2 may be provided to the UI framework 142-7 and displayed on the display 150.

The connection manager 142-3 is a module to support wire or wireless network connection, and includes a Distributed.net (DNET) module and a Universal Plug and Play (UPnP) module.

The security module 142-4 supports certification for hardware, permission of a request, and a secure storage.

The system manager 142-5 monitors a state of each element of the flexible apparatus and provides a result of the monitoring to the other modules. For example, when battery remains are insufficient, an error occurs, or communication is disconnected, the system manager 142-5 provides the result of the monitoring to the UI framework 142-7 and outputs a notice message or sound.

The multimedia framework 142-6 is a module that plays back multimedia content stored in the flexible apparatus 100 or provided from an external source. The multimedia framework 142-6 may include a player module, a camcorder module, and a sound processing module. When these modules are executed, the multimedia framework 142-6 controls hardware elements, such as the audio processor 184 and the video processor 185, and generates a screen and a sound by playing back the multimedia content, and reproduces the multimedia content.

The UI framework 142-7 is a module for providing various UI screens. The UI framework 142-7 may include an image compositor module to configure various image objects, a coordinate combination module to calculate coordinates where the image object is to be displayed, a rendering module to render the configured image object on the calculated coordinates, and a 2D/3D UI toolkit to provide a tool for configuring a UI of a 2D or 3D format. As described above, the UI framework 142-7 may be executed by the screen generator 120 and generate various UI screens. Also, when local shape deformation, such as crumpling is performed, the UI framework 142-7 may wholly or locally change the UI screen according to the shape deformation.

The sensing module 142-8 analyzes results of sensing by the sensors 110-1 to 110-n and various sensors included in the sensor 190, or input signals input through the button, the microphone, and the camera. The main CPU 133 executes the sensing module 142-8 and monitors changes in the sensing values of the sensors, and determines whether local shape deformation, such as crumpling or other shape deformation, occurs. When it is determined that an event having to change a screen occurs according to a result of analyzing by the sensing module 142-8, the sensing module 142-8 transmits the event to the UI framework 142-7 and controls to perform an operation corresponding to the event.

The communication module 142-9 is configured to drive various communicating means included in the communicator 170 of FIG. 31 and communicate with external apparatuses.

The application module 143 includes applications for supporting various functions. For example, the application module 143 may include program modules 143-1 to 143-n for providing various services, such as a navigation program module, a game module, an e-book module, a calendar module, and a notice management module. According to an exemplary embodiment, the main CPU 133 may delete the applications 143-1 to 143-n of the application module 143 according to the above-described crumpling, pinching up, or poking down.

The program configuration stored in the storage 140 illustrated in FIG. 32 is merely exemplary, and the program configuration may be variously changed. For example, the storage 140 includes various programs, such as a messaging module, such as a messenger program, a short message service (SMS) and multimedia message service (MMS) program, and an email program, a call information aggregator program module, a voice over internet protocol (VoIP) module, and a web browser module.

According to the various exemplary embodiments as described above, the flexible apparatus may sense simple types of shape deformation, such as normal bending or multi-bending as well as special types of shape deformation, such as crumpling, pinching up, or poking down, and perform corresponding operations. Accordingly, the flexible apparatus may be widely used and the user enjoys using the flexible apparatus, so that the user's satisfaction is improved.

The control method of the flexible apparatus according to the above-described various exemplary embodiments may be coded as software and stored in a non-transitory computer readable medium. The non-transitory computer readable medium may be connected to or mounted in the various types of flexible apparatuses described above, and may support the above-described display method to be performed in the apparatus.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
   a flexible display configured to display a user interface (UI) screen;
   a plurality of sensors configured to sense deformation of the flexible display;
   a storage configured to store a first predetermined condition or a second predetermined condition; and
   a controller configured to determine whether a sensing result of the plurality of sensors satisfies the first predetermined condition or the second predetermined condition, the first predetermined condition or the second predetermined condition being satisfied when sensing values are sensed only by sensors located in an area except for an edge area of the flexible display from among all of the sensors, and in response to determining that the first predetermined condition or the second predetermined condition is satisfied, control the flexible display to change the UI screen corresponding to the first predetermined condition or the second predetermined condition, wherein the first predetermined condition is a condition in which in response to a touch input on one side of the flexible display, the flexible display is bent such that part of the flexible display is protruded in a direction of the one side, and wherein the second predetermined condition is a condition in which, in response to a touch input on one side of the flexible display, the flexible display is bent such that part of the flexible display is protruded in a direction of another side.

2. The flexible display apparatus as claimed in claim 1, wherein the flexible display comprises:

a display panel;

a first protection layer stacked on a first surface of the display panel and made of a flexible material; and a second protection layer stacked on a second surface of the display panel and made of a flexible material, wherein, when the first predetermined condition occurs in a first direction, the first protection layer is separated from the first surface at a point where the first predetermined condition is satisfied, wherein, when the first predetermined condition occurs in a second direction which is opposite to the first direction, the second protection layer is separated from the second surface at a point where the first predetermined condition is satisfied, and wherein the plurality of sensors are touch sensors arranged on the first surface or the second surface of the display panel, and are configured to sense separation between the first protection layer and the display panel, and separation between the second protection layer and the display panel.

3. The flexible display apparatus as claimed in claim 1, wherein, the controller is configured to, in response to determining that the first predetermined condition or the second predetermined condition is satisfied, perform an operation related to an object displayed on the UI screen.

4. The flexible display apparatus as claimed in claim 1, wherein the controller is configured to, in response to determining that the first predetermined condition or the second predetermined condition is satisfied, control the flexible display perform at least one of magnifying or reducing an object displayed at a corresponding point where the first predetermined condition or the second predetermined condition is satisfied, an operation of copying the object, an operation of pasting the copied object on a clip board area, an operation of increasing or decreasing a number displayed at the corresponding point, an operation of displaying detailed information on the object, an operation of displaying an adjustment menu on the object, an operation of deleting the object, an operation of executing a program corresponding to the object, and an operation of transmitting a content corresponding to the object to an external apparatus.

5. A method for controlling of a flexible display apparatus, the method comprising:

displaying a user interface (UI) screen on a flexible display;

sensing, by a plurality of sensors, deformation of the flexible display;

determining whether a first predetermined condition in which a local area of the flexible display, which is an area except for an edge area of the flexible display, is picked up is satisfied or a second predetermined condition in which the local area which is the area except for the edge area of the flexible display is pressed down is satisfied based on a sensing result of the plurality of sensors, wherein the determining comprises determining whether the sensing result of the plurality of sensors satisfies the first predetermined condition or the second predetermined condition; and performing an operation corresponding to the first predetermined condition or the second predetermined condition, in response to determining that the first predetermined condition or the second predetermined condition is satisfied, wherein the first predetermined condition is a condition in which, in response to a touch input on one side of the flexible display, the flexible display is bent such that part of the flexible display is protruded in a direction of the one side, and wherein the second predetermined condition is a condition in which, in response to a touch input on one side of the flexible display, the flexible display is bent such that part of the flexible display is protruded in a direction of another side.

6. The method as claimed in claim 5, wherein the operation comprises changing the UI screen displayed on the flexible display.

7. The method as claimed in claim 6, wherein the operation comprises at least one of an operation of magnifying or reducing an object displayed at a point where the first predetermined condition or the second predetermined condition is satisfied, an operation of copying the object, an operation of pasting the copied object on a clip board area, an operation of increasing or decreasing a number displayed at a corresponding point, an operation of displaying detailed information on the object, an operation of displaying an adjustment menu on the object, an operation of deleting the object, an operation of executing a program corresponding to the object, and an operation of transmitting content corresponding to the object to an external apparatus.

8. A non-transitory computer readable recording medium storing a program that is executable by a computer to perform the method of claim 5.

9. A flexible apparatus comprising:

a flexible display configured to display a user interface (UI) screen;

a plurality of sensors configured to sense a deformation of the flexible display;

a storage configured to store a condition for determining a type of the deformation; and a controller configured to determine whether the deformation of the flexible display corresponds to one of a first predetermined condition related to deformation of the flexible display, a second predetermined condition in which a local area of the flexible display, which is an area except for an edge area of the flexible display, is picked up, and a third predetermined condition in which the local area which is the area except for the edge area of the flexible display is pressed down by comparing a sensing result of the plurality of sensors and the condition stored in the storage, and perform an operation corresponding to the condition, wherein the first predetermined condition is a condition in which a plurality of bending lines are formed in the flexible display within a predetermined time, and the controller is configured to determine that the first predetermined condition is satisfied in response to determining that sensing values are output from more than a predetermined number of sensors within the predetermined time, wherein the second predetermined condition is a condition in which, in response to a touch input on one side of the flexible display, the flexible display is bent such that part of the flexible display is protruded in a direction of the one side, and wherein the third predetermined condition is a condition in which, in response to a touch input on one side of the flexible display, the flexible display is bent such that part of the flexible display is protruded in a direction of another side.

10. The flexible display apparatus as claimed in claim 9, wherein the operation comprises controlling the flexible display to change the UI screen.

11. The flexible display apparatus as claimed in claim 10, wherein the condition is the first predetermined condition comprising at least one of a condition on a maximum number of sensors outputting sensing values by sensing a shape deformation of the flexible display, a condition on a maximum number of bending lines formed by the shape deformation of the flexible display, a condition on a forming direction of each of the bending lines, a condition on a forming angle of each of the bending lines, a condition on a number of points of intersection between the bending lines, and a condition on a time range within which the bending lines are formed.

12. The flexible display apparatus as claimed in claim 9, wherein the operation comprises controlling the flexible display to perform at least one of shuffling locations of a plurality of contents displayed on the UI screen, deleting content or a program corresponding to the UI screen, turning off the UI screen, and shutting off power of the flexible display, in response to determining that the deformation corresponds to the first predetermined condition.

13. The flexible display apparatus as claimed in claim 9, wherein the controller is configured to determine whether the deformation corresponds to the second predetermined condition or the third predetermined condition by determining that the deformation is sensed from a limited part of the flexible display, and perform at least one of magnifying or reducing an object displayed at a corresponding point, copying the object and pasting the copied object on a clip board area, increasing or decreasing a number displayed at the corresponding point, displaying detailed information on the object, displaying an adjustment menu on the object, deleting the object, executing a program corresponding to the object, and transmitting content corresponding to the object to an external apparatus, in response to determining that the deformation corresponds to the second predetermined condition or the third predetermined condition.

* * * * *